(12) United States Patent
Cruickshank et al.

(10) Patent No.: US 9,935,351 B2
(45) Date of Patent: *Apr. 3, 2018

(54) IMPEDANCE MATCHING IN VERY HIGH DIELECTRIC CONSTANT ISOLATOR/CIRCULATOR JUNCTIONS

(71) Applicant: Skyworks Solutions, Inc., Woburn, MA (US)

(72) Inventors: David Bowie Cruickshank, Rockville, MD (US); Michael David Hill, Frederick, MD (US); Iain Alexander MacFarlane, Midleton (IE)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,696

(22) Filed: Apr. 6, 2017

(65) Prior Publication Data

US 2017/0279176 A1 Sep. 28, 2017

Related U.S. Application Data

(63) Continuation of application No. 14/798,817, filed on Jul. 14, 2015, now Pat. No. 9,640,849.

(Continued)

(51) Int. Cl.
*H01P 1/387* (2006.01)
*C04B 35/26* (2006.01)
(Continued)

(52) U.S. Cl.
CPC ............... *H01P 1/387* (2013.01); *C04B 35/26* (2013.01); *C04B 35/6261* (2013.01); *C04B 35/6267* (2013.01); *C04B 35/62655* (2013.01); *C04B 35/62695* (2013.01); *H01P 11/001* (2013.01); *C04B 2235/3206* (2013.01); *C04B 2235/3208* (2013.01); *C04B 2235/3225* (2013.01); *C04B 2235/3232* (2013.01); *C04B 2235/3239* (2013.01); *C04B 2235/3244* (2013.01); *C04B 2235/3251* (2013.01);
(Continued)

(58) Field of Classification Search
CPC ...... H01P 1/32; H01P 1/36; H01P 1/38; H01P 1/383; H01P 1/387
USPC .................................................. 333/1.1, 24.2
See application file for complete search history.

(56) References Cited

U.S. PATENT DOCUMENTS 3,781,704 A 12/1973 De Gruyl
3,851,279 A 11/1974 Andrikian
(Continued)

FOREIGN PATENT DOCUMENTS

CN 103715487 3/2016
JP 2001-028504 1/2001
(Continued)

*Primary Examiner* — Stephen E Jones
(74) *Attorney, Agent, or Firm* — Knobbe Martens Olson and Bear LLP

(57) ABSTRACT

Disclosed are embodiments of isolator/circulator junctions that can be used for radio-frequency (RF) applications, and methods of manufacturing the junctions. The junctions can have excellent impedance matching, even as they are being miniaturized, providing significant advantages over previously used junctions. The junctions can be formed of both high and low dielectric constant material.

20 Claims, 29 Drawing Sheets

Related U.S. Application Data

(60) Provisional application No. 62/028,125, filed on Jul. 23, 2014.

(51) Int. Cl.
 *H01P 11/00* (2006.01)
 *C04B 35/626* (2006.01)

(52) U.S. Cl.
 CPC .......... *C04B 2235/3256* (2013.01); *C04B 2235/3286* (2013.01); *C04B 2235/3294* (2013.01); *C04B 2235/3296* (2013.01); *C04B 2235/3298* (2013.01); *C04B 2235/5427* (2013.01); *C04B 2235/5436* (2013.01); *C04B 2235/5445* (2013.01); *C04B 2235/604* (2013.01); *C04B 2235/6021* (2013.01); *C04B 2235/6025* (2013.01); *C04B 2235/764* (2013.01)

(56) References Cited

U.S. PATENT DOCUMENTS

| | | | |
|---|---|---|---|
| 4,122,418 | A | 10/1978 | Nagao |
| 7,242,264 | B1 | 7/2007 | How |
| 7,687,014 | B2 | 3/2010 | Zheng |
| 8,282,763 | B2 | 10/2012 | Cruickshank |
| 9,640,849 | B2 * | 5/2017 | Cruickshank ........... H01P 1/387 |
| 2012/0280760 | A1 | 11/2012 | Cruickshank |

FOREIGN PATENT DOCUMENTS

| | | |
|---|---|---|
| WO | WO 2011075123 | 6/2011 |
| WO | WO 2012082642 | 6/2012 |
| WO | WO 2012170259 | 12/2012 |

\* cited by examiner

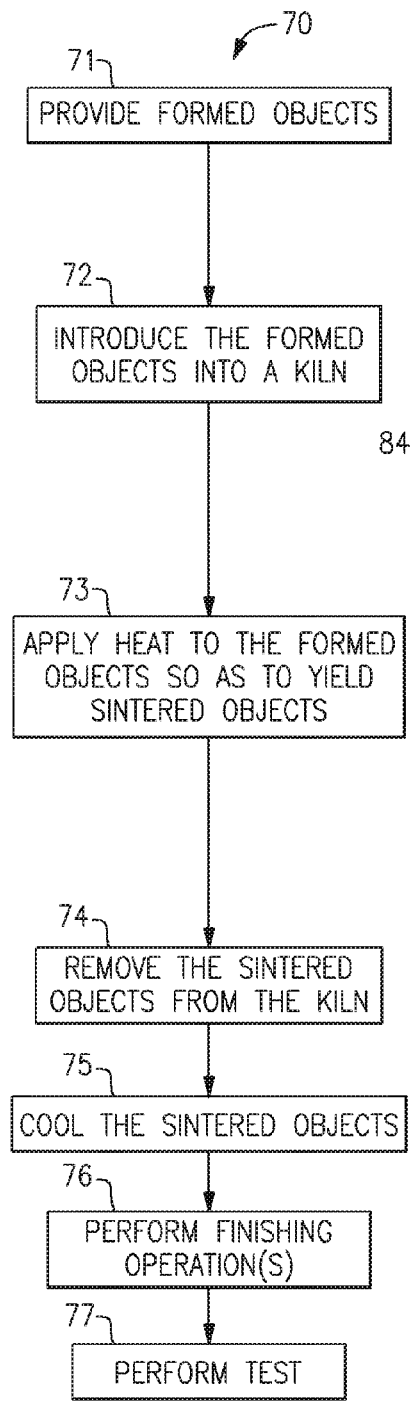

IMPEDANCE MATCHING IN VERY HIGH DIELECTRIC CONSTANT ISOLATOR/CIRCULATOR JUNCTIONS

INCORPORATION BY REFERENCE TO ANY PRIORITY APPLICATIONS

This Application is a continuation of U.S. application Ser. No. 14/798,817, filed Jul. 14, 2015, titled "IMPEDANCE MATCHING IN VERY HIGH DIELECTRIC CONSTANT ISOLATOR/CIRCULATOR JUNCTIONS", which claims from the benefit of U.S. Provisional Application No. 62/028,125, filed Jul. 23, 2014, titled "IMPEDANCE MATCHING IN VERY HIGH DIELECTRIC CONSTANT ISOLATOR/ CIRCULATOR JUNCTIONS," the entirety of each of which is incorporated herein by reference.

BACKGROUND

Field

Embodiments of the disclosure generally relate to methods of preparing compositions and materials useful in electronic applications, and in particular, useful for impedance matching in isolator/circulator junctions.

SUMMARY

Disclosed herein are embodiments of a circulator/isolator junction comprising a pair of ferrite discs, each of the pair having an outer rim, a composite dielectric material surrounding the outer rim of each of the pair of ferrite discs, and a center conductor located between the pair of ferrite discs, the center conductor including a plurality of transmission lines extending away from the center of the center conductor, the composite dielectric material including segments having a first dielectric constant and segments having a second dielectric constant, the first dielectric constant segments being aligned over each of the plurality of transmission lines and having a dielectric constant lower than a dielectric constant of the second dielectric constant segments.

In some embodiments, the composite dielectric material can be generally annular. In some embodiments, the first dielectric constant material can be sufficient to allow for a width of the transmission lines that is within production tolerances of the transmission lines.

In some embodiments, the center conductor can include three transmission lines spaced approximately 120 degrees apart and the composite dielectric material includes three first dielectric constant segments positioned directly above and directly below the transmission lines. In some embodiments, the junction can further include a pair of ground plates located on an outer surface of the pair of ferrite discs.

In some embodiments, the second dielectric constant material can have a dielectric constant of at least 30. In some embodiments, the first dielectric constant material can have a dielectric constant of less than 30. In some embodiments, the composite dielectric material can have a diameter of 25 mm or less for the frequency range 1.8 to 2.7 GHz.

In some embodiments, the junction can have 4 ports and 4 transmission lines. In some embodiments, the junction can have 6 ports and 6 transmission lines. In some embodiments, the center conductor and transmission lines can be configured in a micro-strip configuration.

Also disclosed herein are embodiments of a method of forming a circulator/isolator junction comprising inserting a ferrite rod into a single piece first dielectric constant tube. cutting grooves in the dielectric constant tube having a first dielectric constant to form first dielectric constant segments, inserting and attaching segments having a second dielectric constant into the grooves to form an alternating first and second dielectric constant assembly, the first and second dielectric constants being different, and slicing the alternating first and second dielectric constant assembly to form discs having the ferrite rod alternatingly surrounded by the first dielectric constant segments and the second dielectric constant segments.

In some embodiments, the grooves can extend completely through the diameter of the tube. In some embodiments, the grooves can be spaced approximately 120 degrees apart. In some embodiments, the first dielectric constant tube can have a diameter of 25 mm or less.

Also disclosed herein are embodiments of a segmented circulator/isolator comprising a ferrite disc having an outer rim, a plurality of first dielectric constant material segments surrounding the outer rim of the ferrite disc and having gaps between adjacent first dielectric constant material segments, and a plurality of second dielectric constant material segments surrounding the outer rim of the ferrite disc and located in the gaps, the plurality of second dielectric constant material segments having a higher dielectric constant than the plurality of first dielectric constant material segments, the combination of the plurality of first dielectric constant material segments and the plurality of second dielectric constant material segments forming a ring around the outer rim of the ferrite disc.

In some embodiments, the ferrite disc can include two materials having different dielectric constants. In some embodiments, a width of each of the plurality of first dielectric constant material can be sufficient to allow for a width of a transmission line that is above production tolerances of the transmission line.

In some embodiments, the segmented circulator/isolator can further include a second segmented circulator/isolator junction including a center conductor including three transmission lines spaced approximately 120 degrees apart, the plurality of first dielectric constant segments positioned directly above and directly below the transmission lines. In some embodiments, the segmented circulator/isolator can further include a pair of ground plates located on an outer surface of the disc.

BRIEF DESCRIPTION OF THE DRAWINGS

FIG. 32 shows a process that can be implemented to sinter formed objects such as those formed in the example of FIGS. 30 and 31.

FIG. 33 shows examples of various stages of the process of FIG. 32.

DETAILED DESCRIPTION

The headings provided herein, if any, are for convenience only and do not necessarily affect the scope or meaning of the disclosure.

Disclosed are embodiments of devices and methods of manufacturing high dielectric materials that can be useful for radiofrequency (RF) applications. Specifically, disclosed herein are devices that can have improved miniaturization qualities, while maintaining high RF properties, which can be advantageous for use in electronic components. For example, particular materials can be selected to form components with improved RF properties. Further, particular structures of the components can be advantageous to RF properties of the devices. Moreover, the combination of structure and material can be especially advantageous.

While isolators and circulators are discussed in detail below, it will be understood that the disclosure is not so limited to those particular applications, and the disclosure can be useful on any component that undergoes radiofrequency application.

Figure 1:
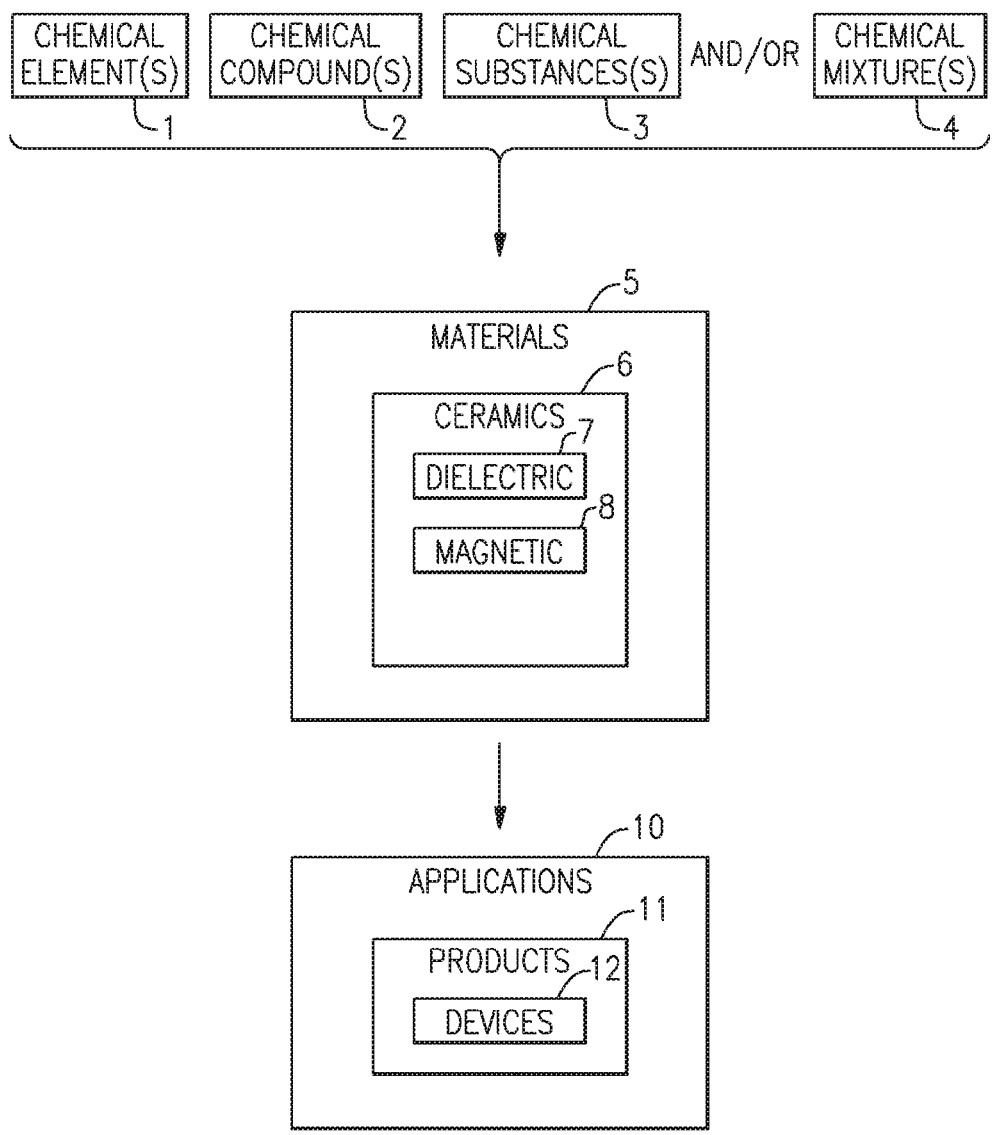
FIG. 1 schematically shows how materials having one or more features described herein can be designed, fabricated, and used.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8), and/or an advanced material property (block 9).

Figure 2:
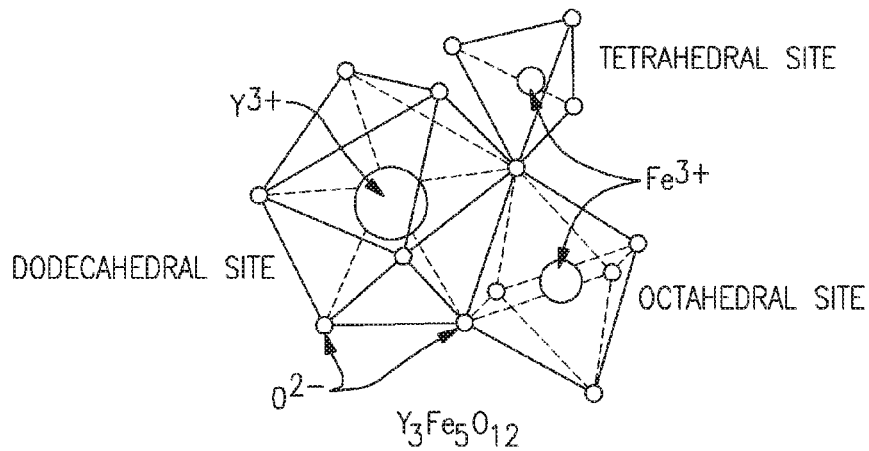
FIG. 2 depicts a Yttrium based garnet crystal lattice structure.

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein Modified Synthetic Garnet Compositions:

Disclosed herein are methods of modifying synthetic garnet compositions, such as Yttrium Iron Garnet (YIG), to reduce or eliminate the use of rare earth metals in such compositions. Synthetic garnets typically have the formula unit of $A_3B_5O_{12}$, where A and B are trivalent metal ions. Yttrium Iron Garnet (YIG) is a synthetic garnet having the formula unit of $Y_3Fe_5O_{12}$, which includes Yttrium (Y) in the 3+ oxidation state and Iron (Fe) in the 3+ oxidation state. The crystal structure of a YIG formula unit is depicted in FIG. 2. The modified synthetic garnet compositions, in some embodiments, comprise substituting some or all of the Yttrium (Y) in Yttrium Iron Garnets (YIG) with a combination of other ions such that the resulting material maintains desirable magnetic properties for microwave applications.

In one implementation, the modified synthetic garnet composition may be represented by general Formula I: $Bi_xCa_{y+2x}Y_{3-x-y-2z}Fe_{5-y-z}Zr_yV_zO_{12}$, where x=0 to 3, y=0 to 1, and z=0 to 1.5, more preferably x=0.5 to 1.4, y=0.3 to 0.55, and z=0 to 0.6. In another implementation, the modified synthetic garnet composition may be represented by general Formula II: $Bi_xY_{3-x-0.35}Ca_{0.35}Zr_{0.35}Fe_{4.65}O_{12}$, where x=0.5 to 1.0, preferably x=0.6 to 0.8, more preferably x=0.5. In another implementation, the modified garnet composition may be represented by general Formula III: $Bi(Y, Ca)_2Fe_{4.2}M^I_{0.4}M^{II}_{0.4}O_{12}$, where $M^I$ is the octahedral substitution for Fe and can be selected from one or more of the following elements: In, Zn, Mg, Zr, Sn, Ta, Nb, Fe, Ti, and Sb, where $M^{II}$ is the tetrahedral substitution for Fe and can be selected from one or more of the following elements: Al, Ga, W, Mo, Ge, V, Si.

Figure 3:
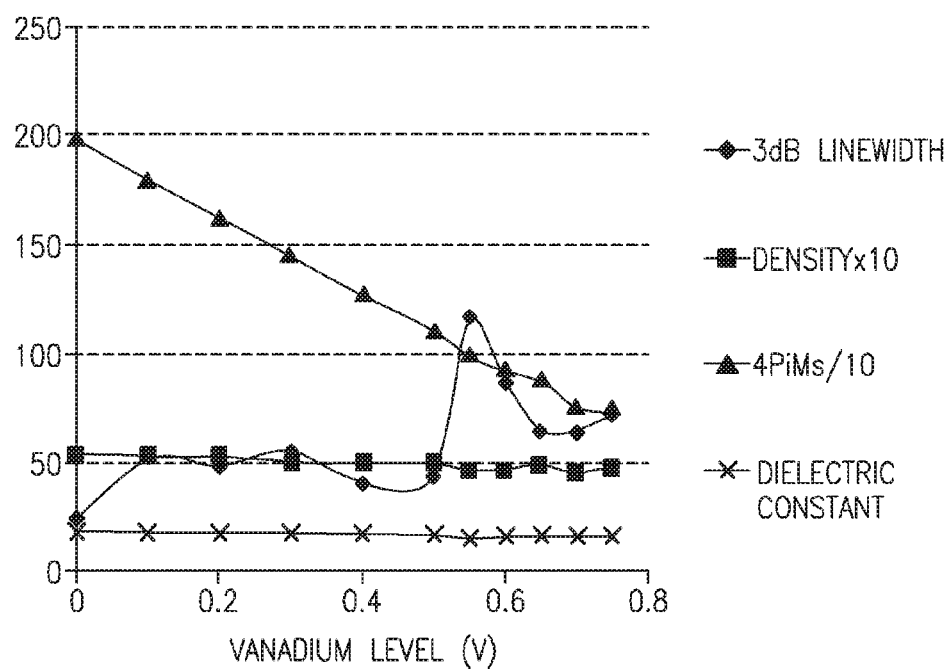
FIG. 3 is an example graph depicting variations of material properties versus varying levels of Vanadium in crystalline compositions represented by the formula $Y_{2.15-2x}Bi_{0.5}Ca_{0.35+2x}Zr_{0.35}V_xFe_{4.65-x}O_{12}$, where x=0.1 to 0.8.
Figure 4:
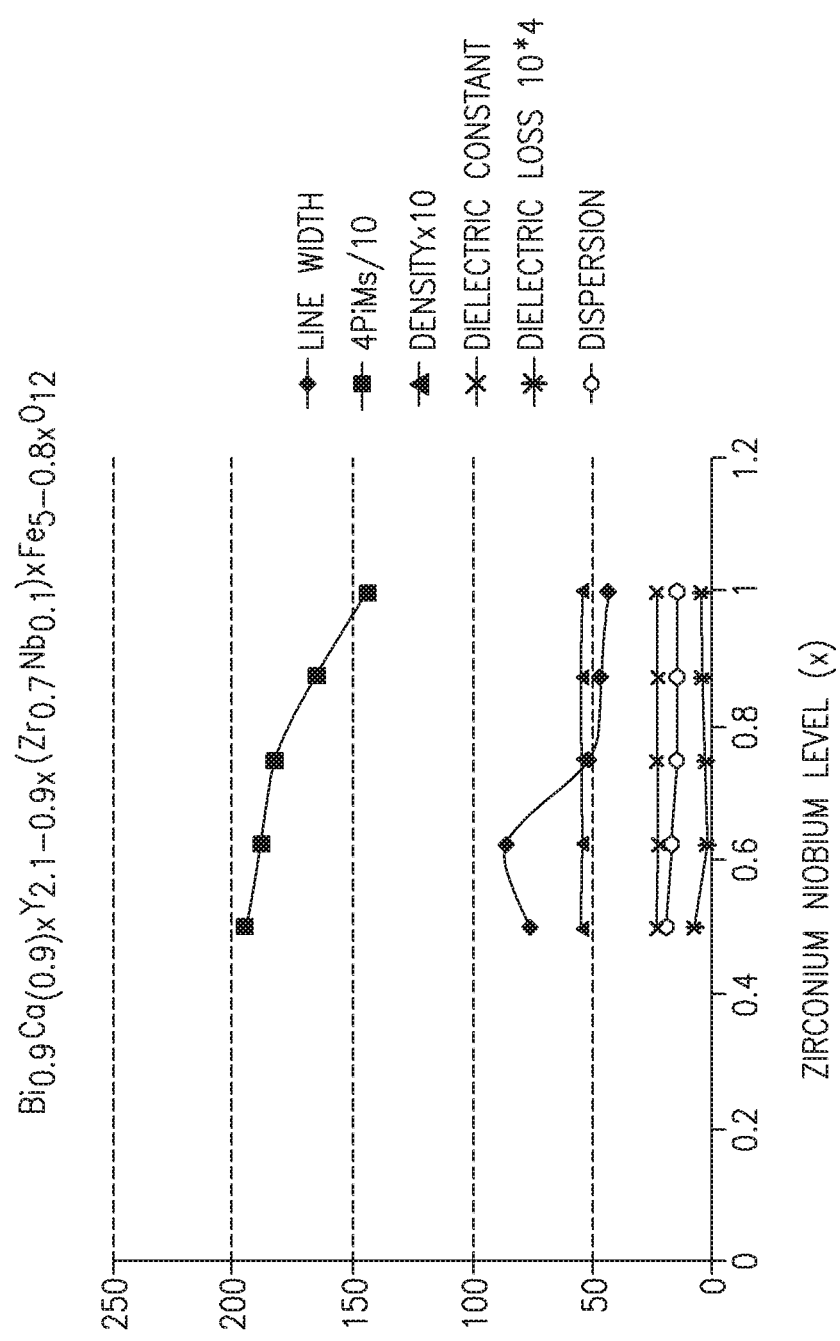
FIG. 4 is an example graph depicting variations of material properties versus varying levels of (Zr, Nb) in crystalline compositions represented by the formula $Bi_{0.9}Ca_{0.9x}Y_{2.1-0.9x}(Zr_{0.7}Nb_{0.1})_xFe_{5-0.8x}O_{12}$, where x=0.5 to 1.0.
Figure 5A:
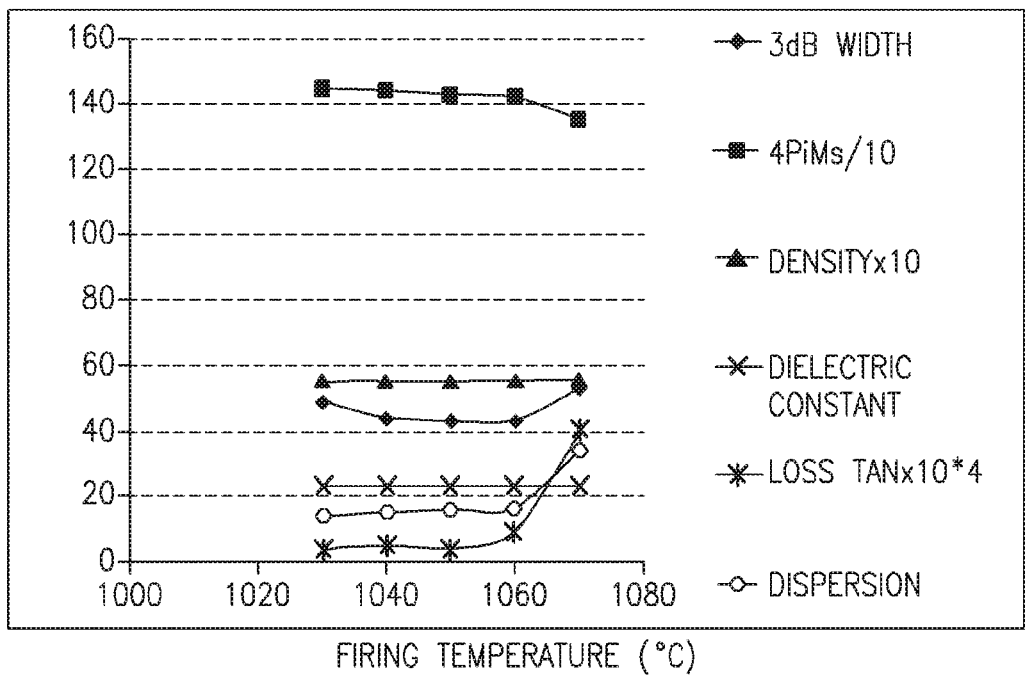
FIGS. 5A-5G are example graphs depicting the relationship between firing temperature and various properties at varying levels of Vanadium in crystalline compositions represented by the formula $Bi_{0.9}Ca_{0.9+2x}Zr_{0.7}Nb_{0.1}V_xFe_{4.2-x}O_{12}$ where x=0-0.6.
Figure 5B:
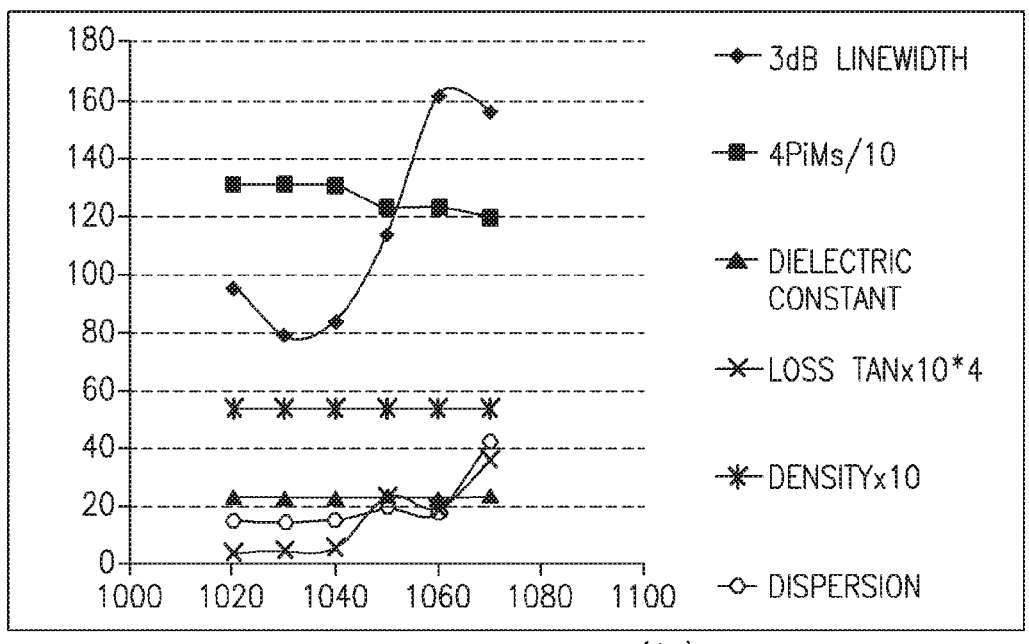
Figure 5C:
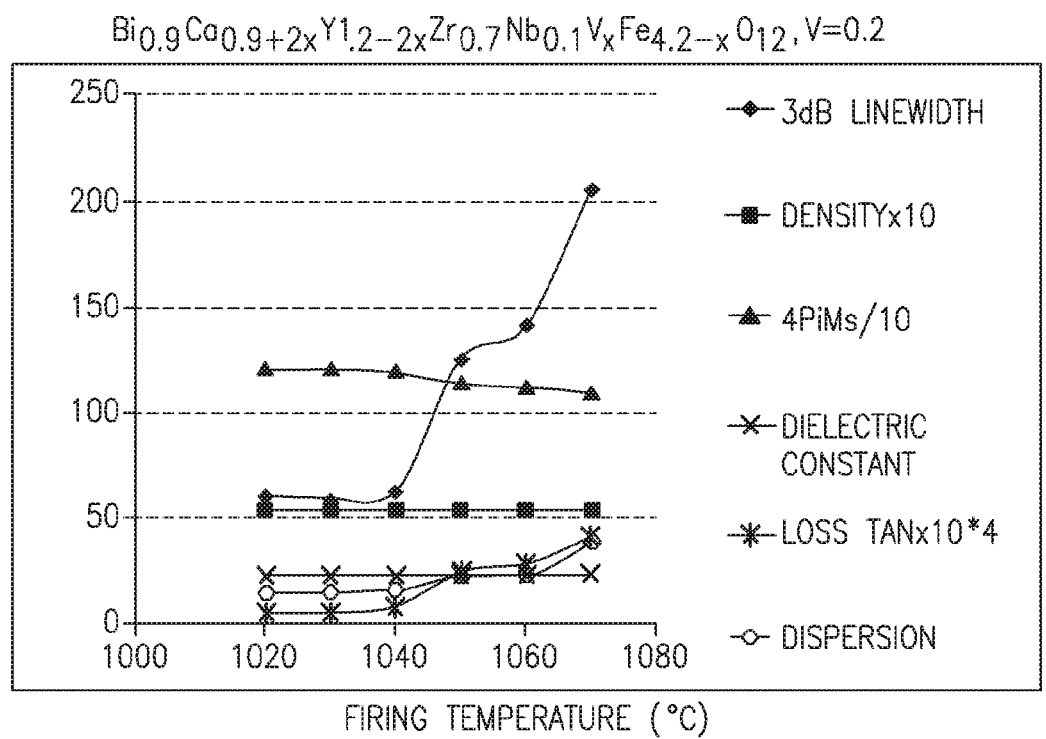
Figure 5D:
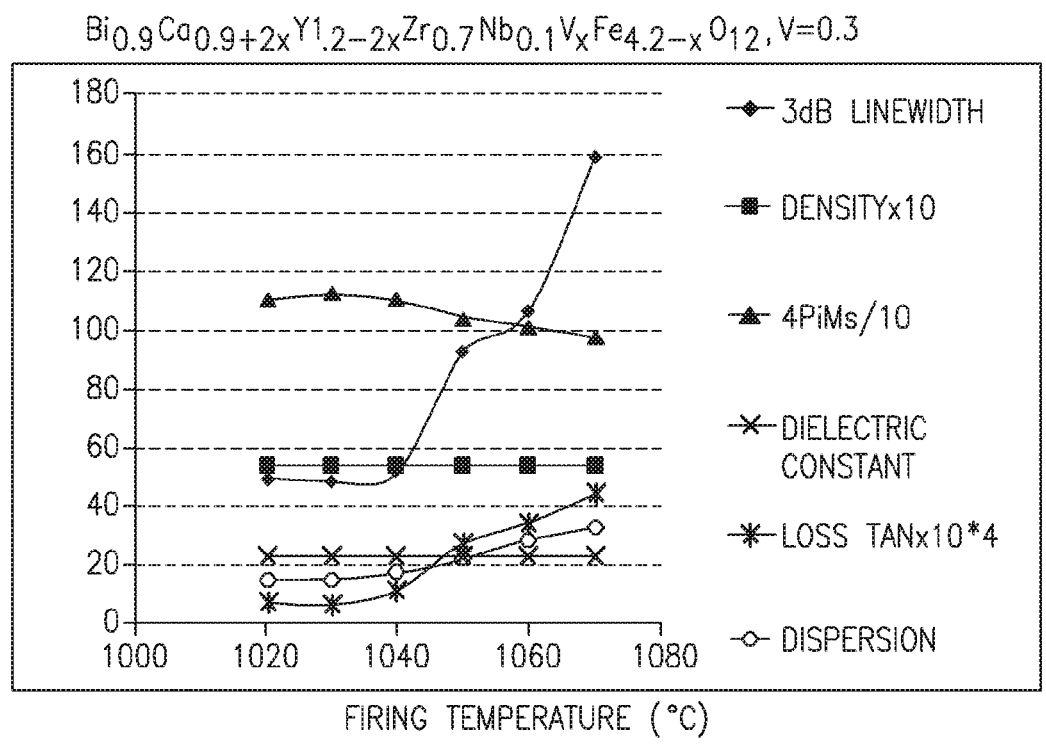
Figure 5E:
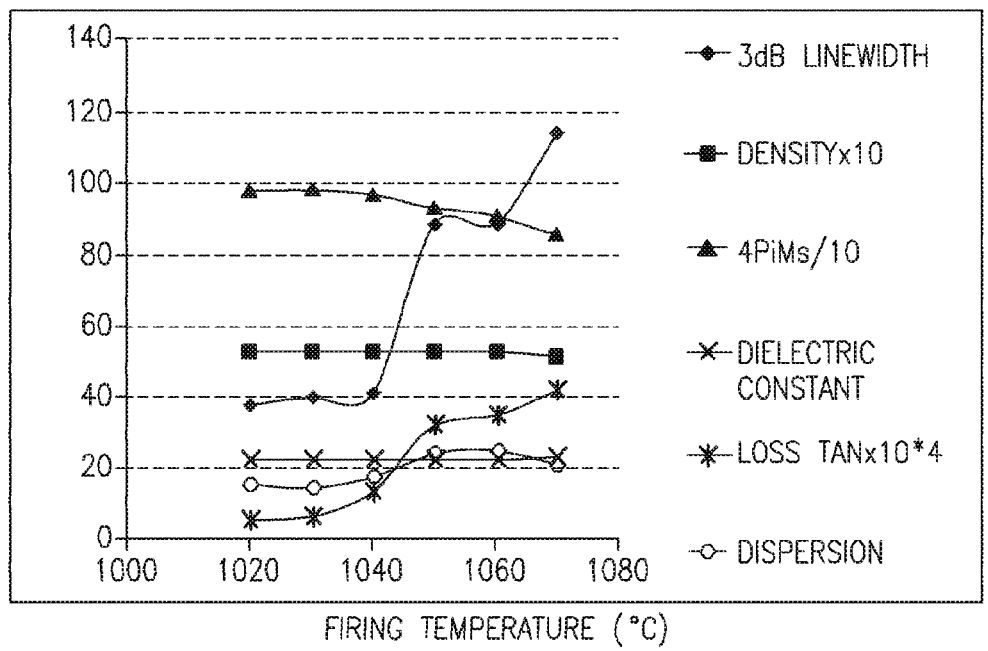
Figure 5F:
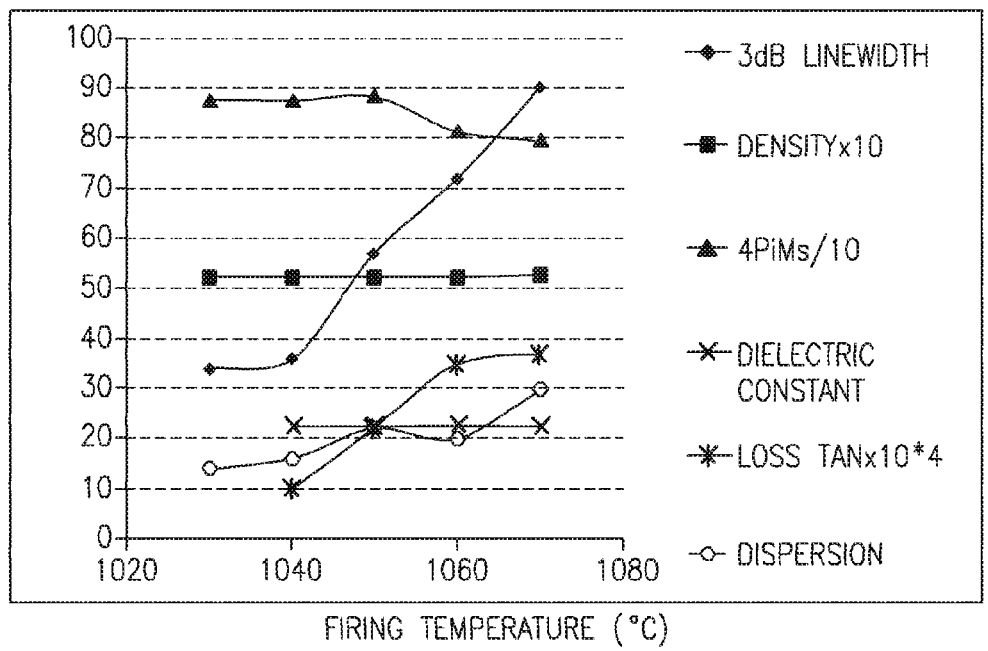
Figure 5G:
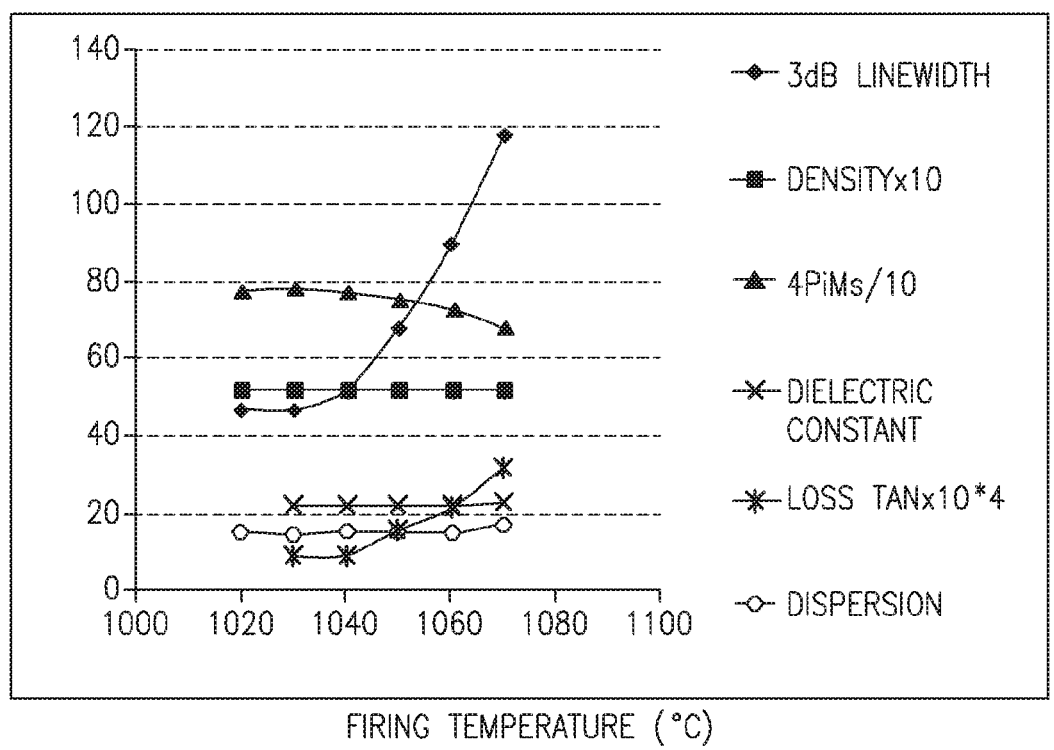
Figure 6:
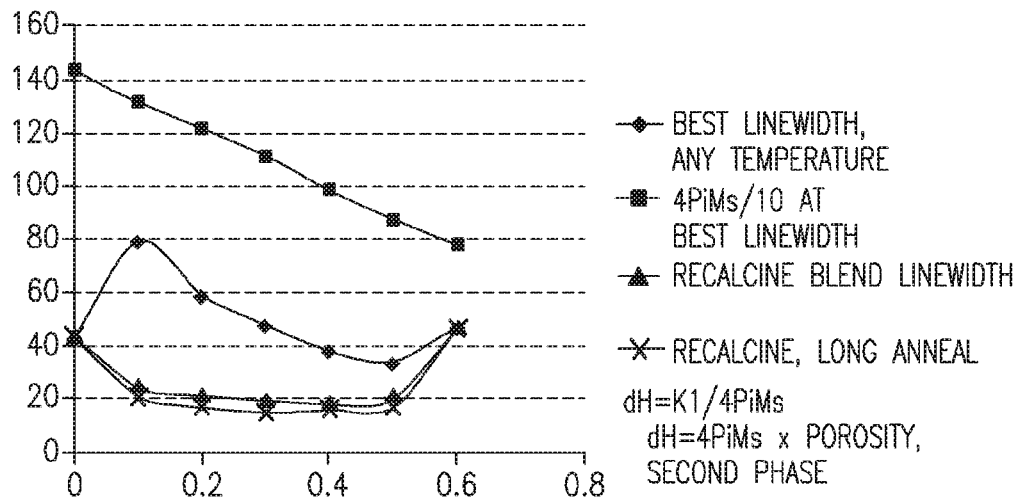
FIG. 6 is an example graph depicting best linewidth versus composition of varying Vanadium content in crystalline compositions represented by the formula $Bi_{0.9}Ca_{0.9+2x}Zr_{0.7}Nb_{0.1}V_xFe_{4.2-x}O_{12}$ where x=0-0.6.
Figure 7:
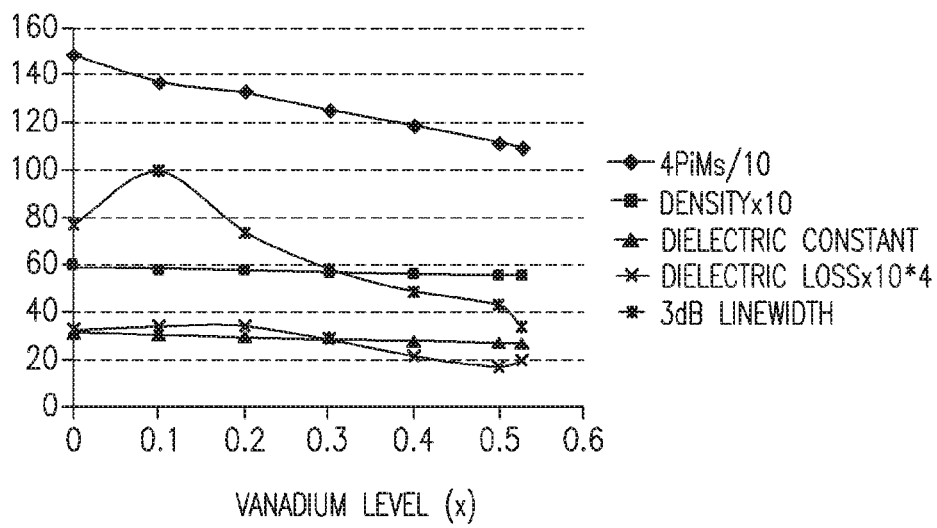
FIG. 7 is an example graph illustrating the properties of crystal compositions represented by the formula $Bi_{1.4}Ca_{1.05-2x}Zr_{0.55}V_xFe_{4.45-x}O_{12}$, where x=0-0.525.

In another implementation, the modified synthetic garnet composition may be represented by general Formula IV: $Y_{2.15-2x}Bi_{0.5}Ca_{0.35+2x}Zr_{0.35}V_xFe_{4.65-x}O_{12}$, wherein x=0.1 to 0.8. FIG. 3 illustrates variations of material properties in connection with varying levels of V. In another implementation, the modified synthetic garnet composition may be represented by Formula V: $Bi_{0.9}Ca_{0.9x}Y_{2.1-0.9x}(Zr_{0.7}Nb_{0.1})_xFe_{5-0.8x}O_{12}$, wherein x=0.5 to 1.0. FIG. 4 illustrates variations of material properties in connection with varying levels of (Zr, Nb). In another implementation, the modified synthetic garnet composition may be represented by Formula VI: $Bi_{0.9}Ca_{0.9+2x}Y_{2.1-0.9-2x}Zr_{0.7}Nb_{0.1}V_xFe_{4.2-x}O_{12}$, where V=0-0.6. FIGS. 5A-5G illustrate the relationship between firing temperatures and various material properties as V level increases from 0 to 0.6. FIG. 6 illustrates the best linewidth at varying firing temperatures versus composition at varying levels of V of one preferred embodiment. In another implementation, the modified synthetic garnet composition may be represented by Formula VI: $Bi_{1.4}Ca_{0.55+2x}Y_{1.05-2x}Zr_{0.55}V_xFe_{4.45-x}O_{12}$, where x=0-0.525. FIG. 7 illustrates the properties of the material with varying amount of V.

In another implementation, the modified synthetic garnet composition may be represented by Formula VII: $Y_2CaFe_{4.4}Zr_{0.4}Mo_{0.2}O_{12}$. In other implementations, the modified synthetic garnet compositions can be represented by a formula selected from the group consisting of:
$BiY_2Fe_{4.6}In_{0.4}O_{12}$, $BiCa_{0.4}Y_{1.6}Fe_{4.6}Zr_{0.4}O_{12}$,
$BiCa_{0.4}Y_{1.6}Fe_{4.6}Ti_{0.4}O_{12}$, $BiCa_{0.8}Y_{1.2}Fe_{4.6}Sb_{0.4}O_{12}$,
$BiY_2Fe_{4.6}Ga_{0.4}O_{12}$, $BiCa_{1.2}Y_{0.8}Fe_{4.2}In_{0.4}Mo_{0.4}O_{12}$,
$BiY_{1.2}Ca_{0.8}Fe_{4.2}Zn_{0.4}Mo_{0.4}O_{12}$,
$BiY_{1.2}Ca_{0.8}Fe_{4.2}Mg_{0.4}Mo_{0.4}O_{12}$,
$BiY_{0.4}Ca_{1.6}Fe_{4.2}Zr_{0.4}Mo_{0.4}O_{12}$,
$BiY_{0.4}Ca_{1.6}Fe_{4.2}Sn_{0.4}Mo_{0.4}O_{12}$, $BiCa_2Fe_{4.2}Ta_{0.4}Mo_{0.4}O_{12}$,
$BiCa_2Fe_{4.2}Nb_{0.4}Mo_{0.4}O_{12}$, $BiY_{0.8}Ca_{1.2}Fe_{4.6}Mo_{0.4}O_{12}$, and
$BiY_{0.4}Ca_{1.6}Fe_{4.2}Ti_{0.4}Mo_{0.4}O_{12}$.

In another implementation, the modified synthetic garnet composition may be represented by Formula VI: $Bi_{1.4}Ca_{0.55+2x}Y_{1.05-2x}Zr_{0.55}V_xFe_{4.45-x}O_{12}$, where x=0-0.525. FIG. 7 illustrates the properties of the material with varying amount of V.

Preparation of the Modified Synthetic Garnet Compositions:

The preparation of the modified synthetic garnet materials can be accomplished by using ceramic techniques. A particular example of the process flow is illustrated in FIG. 8.

Figure 8:
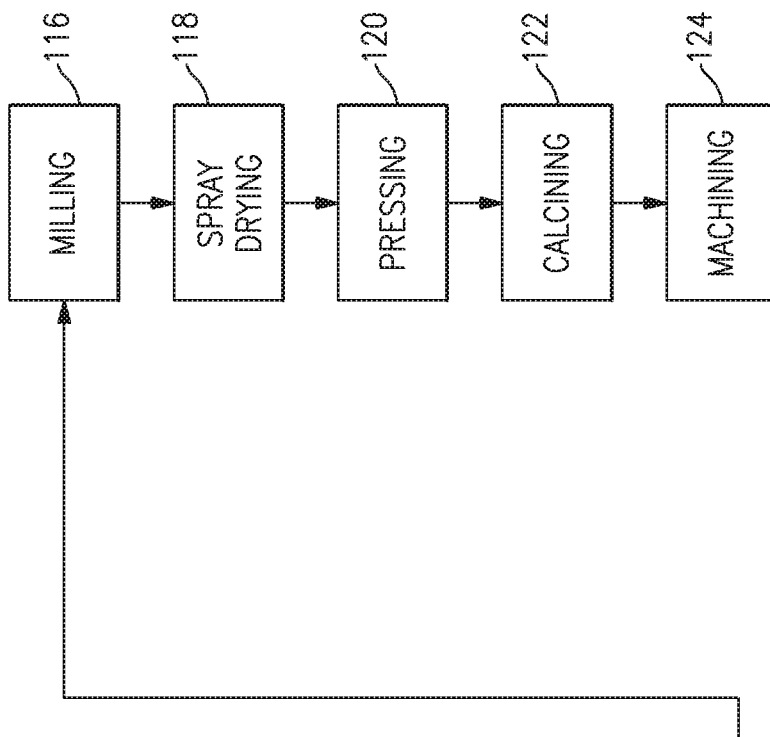
FIG. 8 illustrates an example process flow for making a modified synthetic garnet having one or more features described herein.
Figure 8:
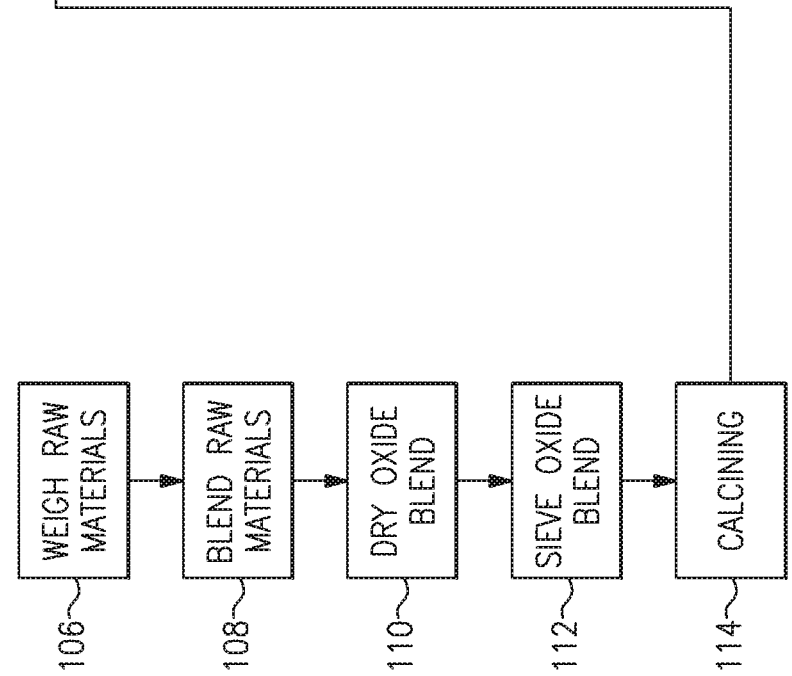

As shown in FIG. 8, the process begins with step 106 for weighing the raw material. In addition, organic based materials may be used in a sol gel process for ethoxides and/or acrylates or citrate based techniques may be employed. Other known methods in the art such as co-precipitation of hydroxides may also be employed as a method to obtain the materials. After the raw material is weighed, they are blended in Step 108 using methods consistent with the current state of the ceramic art, which can include aqueous blending using a mixing propeller, or aqueous blending using a vibratory mill with steel or zirconia media. In some embodiments, a glycine nitrate or spray pyrolysis technique may be used for blending and simultaneously reacting the raw materials.

The blended oxide is subsequently dried in Step 110, which can be accomplished by pouring the slurry into a pane and drying in an oven, preferably between 100-400° C. or by spray drying, or by other techniques known in the art. The dried oxide blend is processed through a sieve in Step 112, which homogenizes the powder and breaks up soft agglomerates that may lead to dense particles after calcining.

The material is subsequently processed through a pre-sintering calcining in Step 114. Preferably, the material is loaded into a container such as an alumina or cordierite sagger and heat treated in the range of about 800-1000° C., more preferably about 900-950° C. Preferably, the firing temperature is low as higher firing temperatures have an adverse effect on linewidth.

After calcining, the material is milled in Step 116, preferably in a vibratory mill, an attrition mill, a jet mill or other standard comminution technique to reduce the median particle size into the range of about 0.5 micron to 10 microns. Milling is preferably done in a water based slurry but may also be done in ethyl alcohol or another organic based solvent. The material is subsequently spray dried in Step 118. During the spray drying process, organic additives such as binders and plasticizers can be added to the slurry using techniques known in the art. The material is spray dried to provide granules amenable to pressing, preferably in the range of about 10 microns to 150 microns in size.

The spray dried granules are subsequently pressed in Step 120, preferably by uniaxial or isostatic pressing to achieve a pressed density to as close to 60% of the x-ray theoretical density as possible. In addition, other known methods such as tape casting, tape calendaring or extrusion may be employed as well to form the unfired body. The pressed material is subsequently processed through a calcining process in Step 122. Preferably, the pressed material is placed on a setter plate made of material such as alumina which does not readily react with the garnet material. The setter plate is heated in a periodic kiln or a tunnel kiln in air or pressure oxygen in the range of between about 850° C.-100° C. to obtain a dense ceramic compact. Other known treatment techniques such as induction heat may also be used in this step. The dense ceramic compact is machined in the Step 124 to achieve dimensions suitable or the particular applications.

Figure 9:
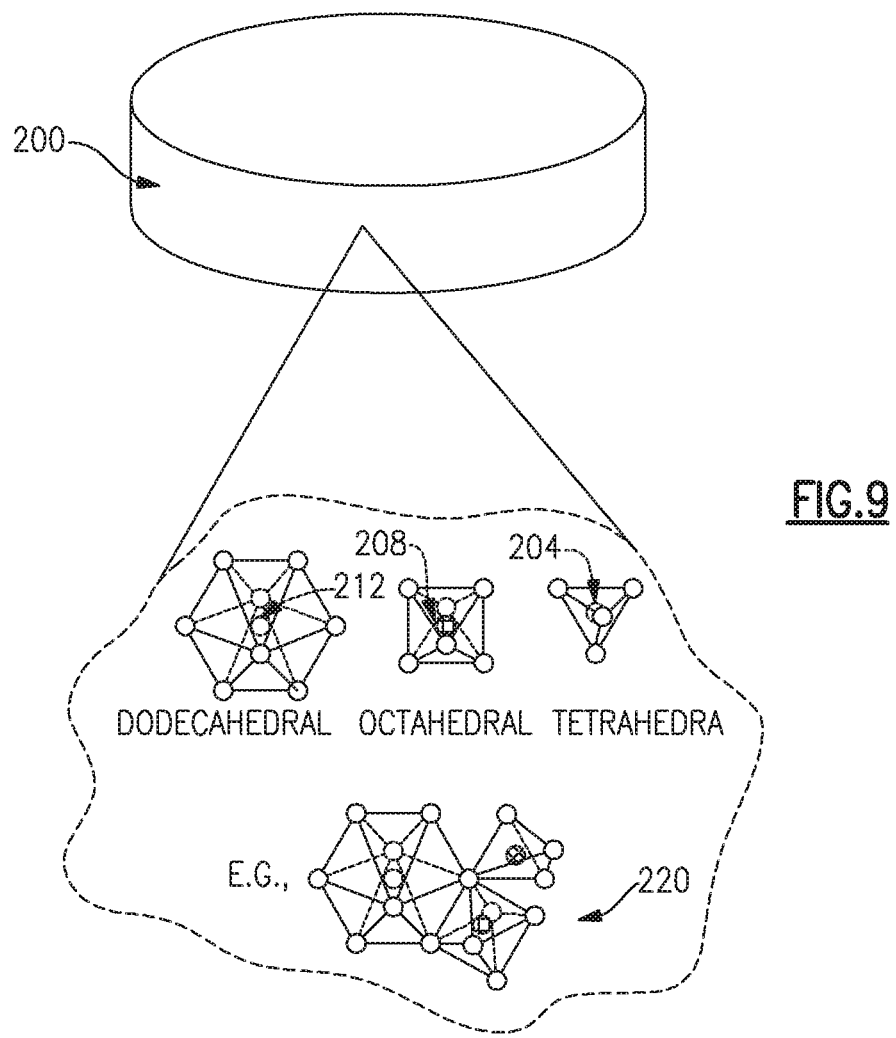
FIG. 9 shows an example ferrite device having one or more garnet features as described herein.

FIG. 9 shows a radio-frequency (RF) device 200 having garnet structure and chemistry, and thus a plurality of dodecahedral structures, octahedral structures, and tetrahedral structures. The device 200 can include garnet structures (e.g., a garnet structure 220) formed from such dodecahedral 212, octahedral 208, and tetrahedral 204 structures.

Figure 10:
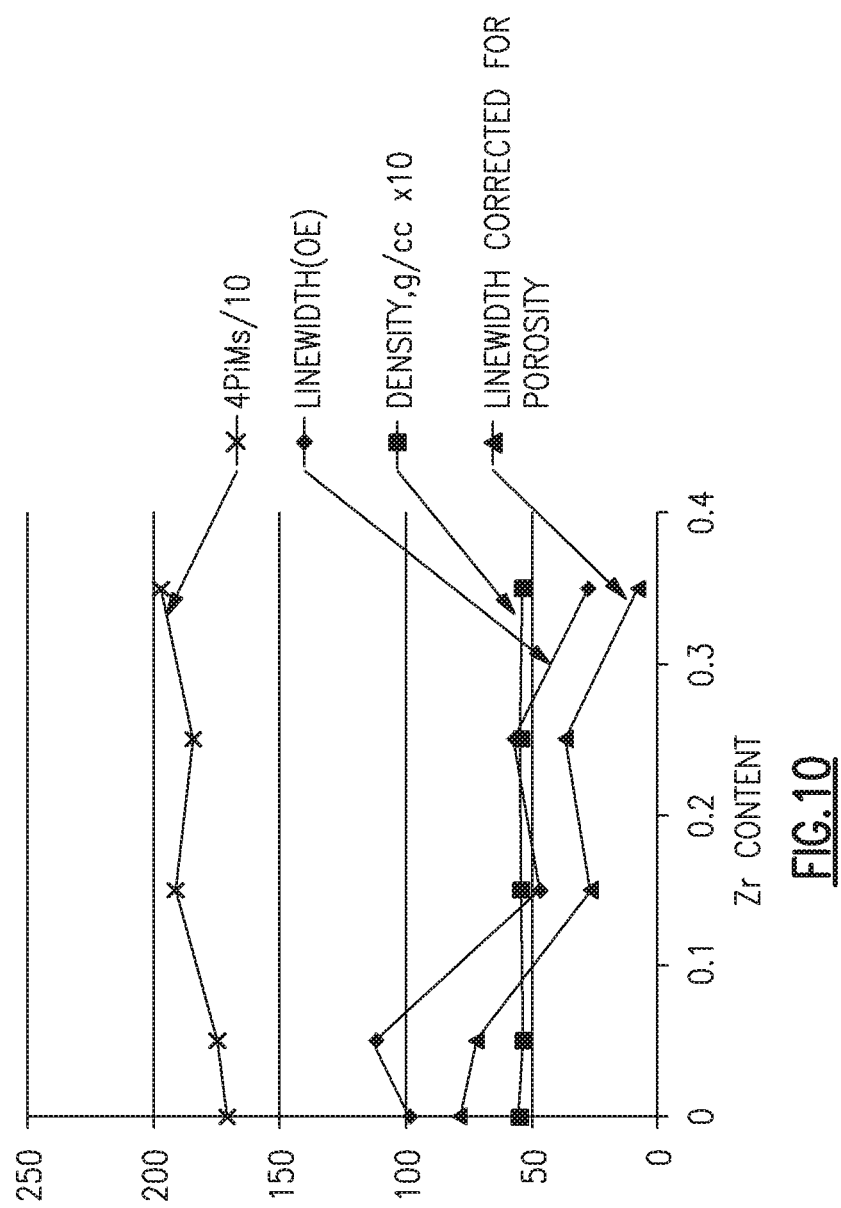
FIG. 10 shows various properties as functions of Zr content for an example composition $Bi_{0.5}Y_{2.5-x}Ca_xZr_xFe_{5-x}O_{12}$ where $Bi^{+3}$ content is substantially fixed at approximately 0.5 while $Zr^{+4}$ content is varied from 0 to 0.35.
Figure 11:
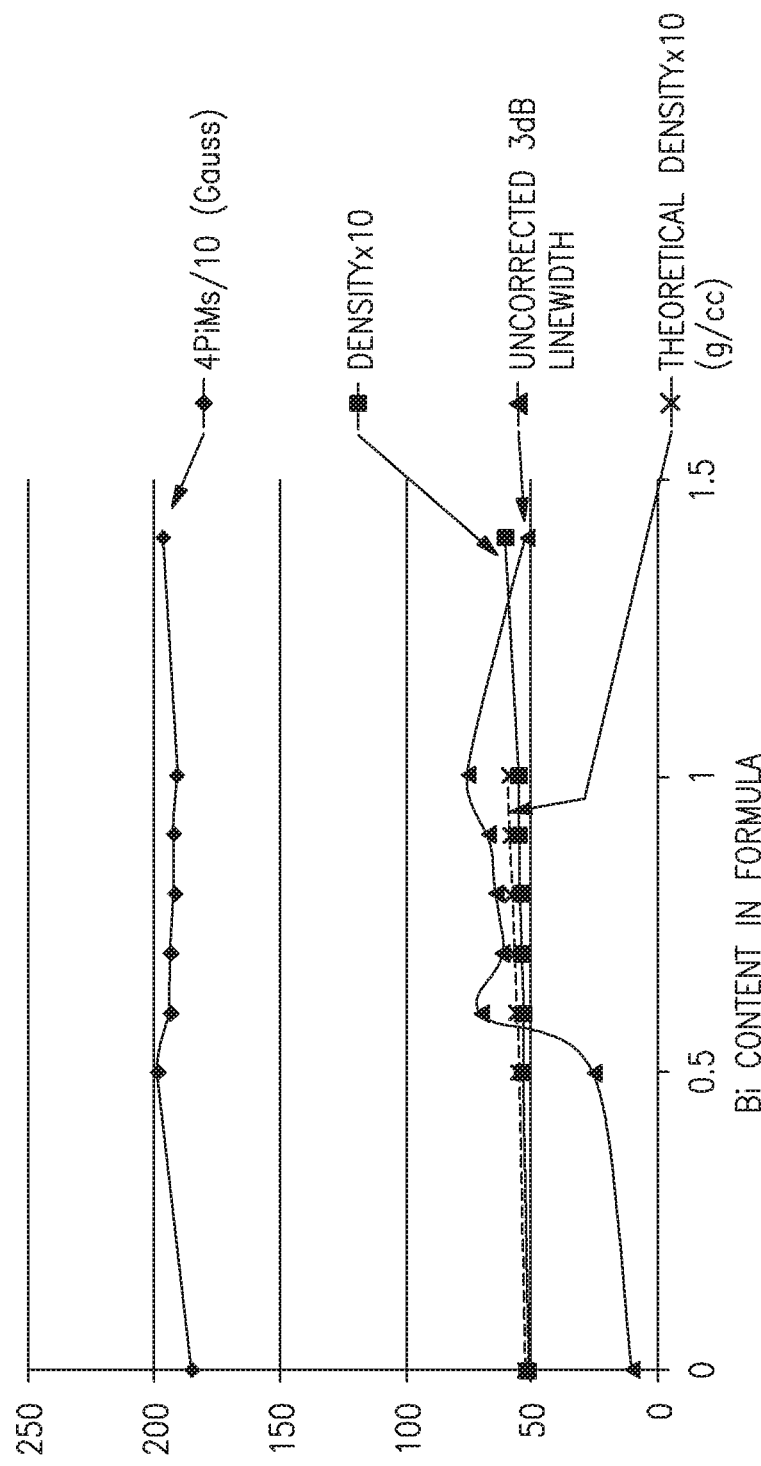
FIG. 11 shows various properties as functions of Bi content for an example composition $Bi_xY_{2.65-x}Ca_{0.35}Zr_{0.35}Fe_{4.65}O_{12}$ where $Zr^{+4}$ content is substantially fixed at approximately 0.35 while $Bi^{+3}$ content is varied.
Figure 12:
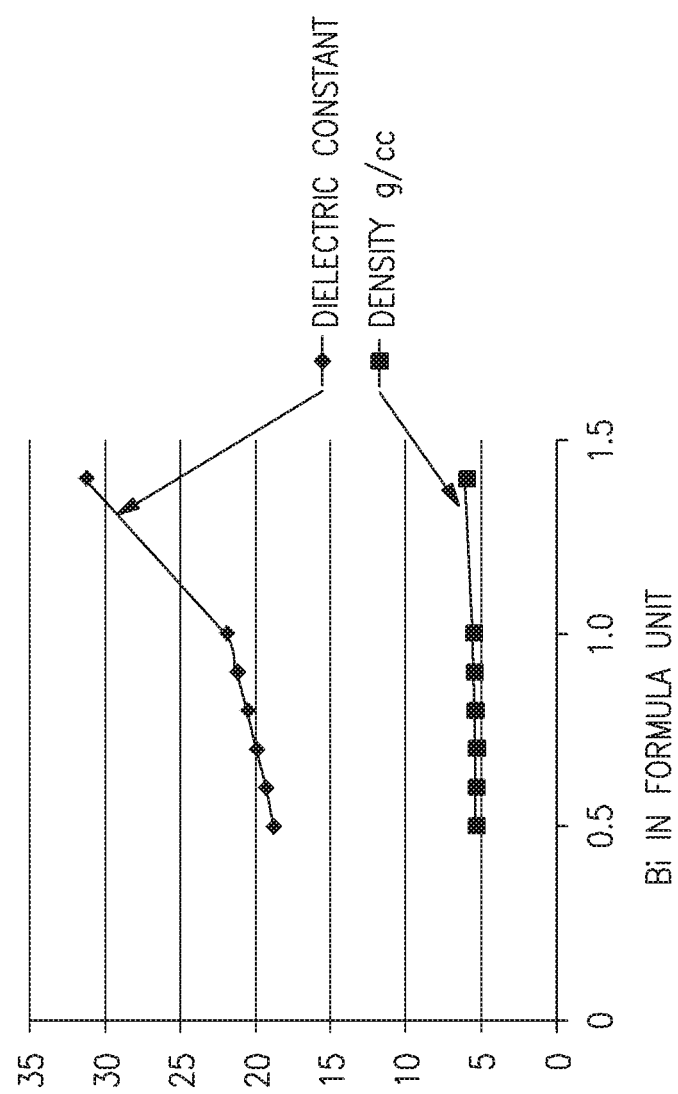
FIG. 12 shows dielectric constant and density as functions of Bi content for the example composition of FIG. 11.
Figure 13:
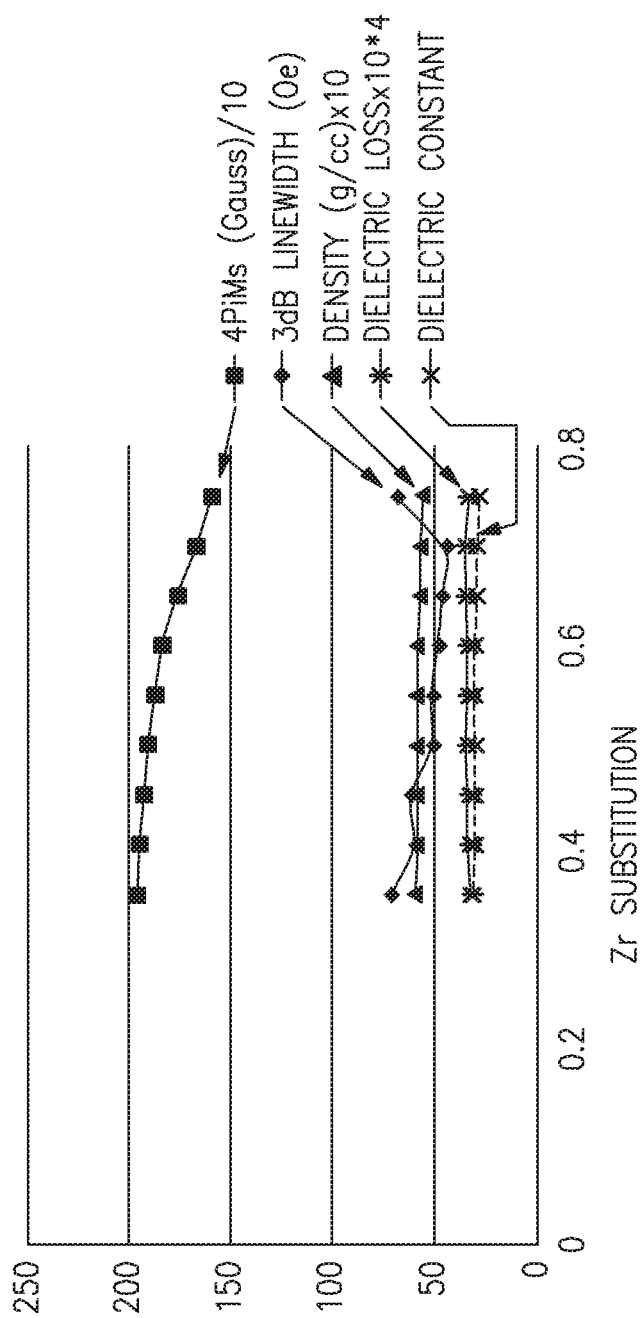
FIG. 13 shows plots of various properties as functions of Zr content that extends beyond the 0.35 limit of the example composition of FIG. 10.
Figure 14:
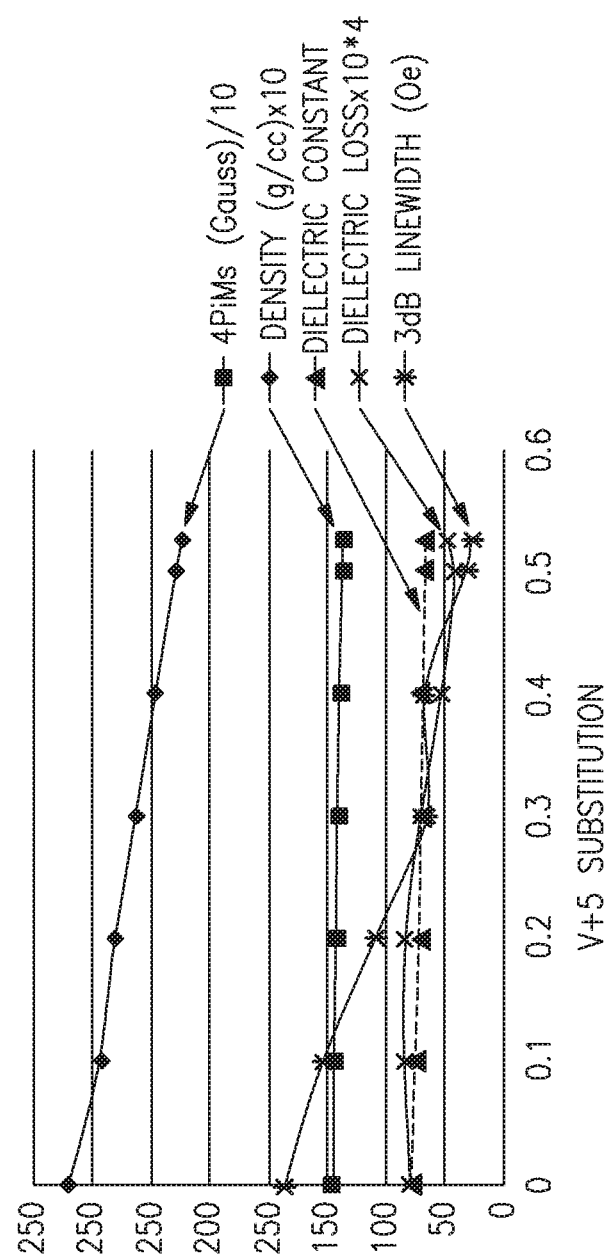
FIG. 14 shows plots of various properties as functions of $V^{+5}$ content when Bi content is approximately 1.4 and Zr content is approximately 0.55 for the example composition of FIG. 13.

Bi Substitution in Polycrystalline Garnets:

To see the effects (e.g., low magnetocrystalline anisotropy and hence low magnetic losses) that can result from combinations of $Bi^{+3}$ on the dodecahedral site and $Zr^{+4}$ on the octahedral site, following approaches were tested. FIG. 10 shows various properties as functions of Zr content for a first configuration ($Bi_{0.5}Y_{2.5-x}Ca_xZr_xFe_{5-x}O_{12}$) where $Bi^{+3}$ content was fixed at approximately 0.5 while $Zr^{+4}$ content was varied from 0 to 0.35. FIG. 11 shows various properties as functions of Bi content for a second configuration ($Bi_xY_{2.65-x}Ca_{0.35}Zr_{0.35}Fe_{4.65}O_{12}$) where $Zr^{+4}$ content was fixed at approximately 0.35 while $Bi^{+3}$ content was varied. FIG. 12 shows dielectric constant and density as functions of Bi content for the same configuration. FIG. 13 shows plots of various properties as functions of Zr content that extends beyond the 0.35 limit described in reference to FIG. 10. FIG. 14 shows plots of various properties as functions of $V^{+5}$ content.

Examples of Devices Having Rare Earth Free or Reduced Garnets:

The modified synthetic garnet compositions made in accordance with the preferred embodiments in this disclosure can be utilized as a ferrite material in a number of different devices utilized in magnetic microwave applications, such as ferrite based isolators, circulators and resonators. Isolators and circulators are necessary in all cellular base stations to direct the RF energy and prevent the energy from flowing back and destroying circuit components. Resonators can be used to filter out signals in cellular base stations. The modified synthetic garnet materials disclosed herein are designed to lower the magnetic resonance linewidth and raise the dielectric constant of the ferrite in circulators and isolators, thus allowing for desirable miniaturization of circulator components.

For example, because the center frequency of a ferrite device (such as a garnet disk) operating in a split polarization transverse magnetic (TM) mode is proportional to $1/(\in)^{1/2}$, doubling the dielectric constant ($\in$) can reduce the frequency by a factor of square root of 2 (approximately 1.414). As described herein in greater detail, increasing the dielectric constant by, for example, a factor of 2, can result in a reduction in a lateral dimension (e.g., diameter) of a ferrite disk by factor of square root of 2. Accordingly, the ferrite disk's area can be reduced by a factor of 2. Such a reduction in size can be advantageous since the device's footprint area on an RF circuit board can be reduced (e.g., by a factor of 2 when the dielectric constant is increased by a factor of 2). Although described in the context of the example increase by a factor of 2, similar advantages can be realized in configurations involving factors that are more or less than 2.

Reduced Size Circulators/Isolators Having Ferrite with High Dielectric Constant:

In some implementations, a relationship between ferrite device size, dielectric constant, and operating frequency can be represented as follows. There are different equations that can characterize different transmission line representations. For example, in above-resonance stripline configurations, the radius R of a ferrite disk can be characterized as $$R = 1.84/[2\pi(\text{effective permeability}) \times (\text{dielectric constant})]^{1/2} \quad (1)$$

where (effective permeability)=$H_{dc}+4\pi M_s/H_{dc}$, with $H_{dc}$ being the magnetic field bias. Equation 1 shows that, for a fixed frequency and magnetic bias, the radius R is inversely proportional to the square root of the dielectric constant.

In another example, in below-resonance stripline configurations, a relationship for ferrite disk radius R similar to Equation 1 can be utilized for weakly coupled quarter wave circulators where the low bias field corresponds to below-resonance operation. For below-resonance waveguide configurations (e.g., in disk or rod waveguides), both lateral dimension (e.g., radius R) and thickness d of the ferrite can influence the frequency. However, the radius R can still be expressed as $$R = \lambda/[2\pi(\text{dielectric constant})^{1/2}][((\pi R)/(2d))^2 + (1.84)^2]^{1/2} \quad (2)$$

which is similar to Equation 1 in terms of relationship between R and dielectric constant.

The example relationship of Equation 2 is in the context of a circular disk shaped ferrites. For a triangular shaped resonator, the same waveguide expression can used, but in this case, A (altitude of the triangle) being equal to $3.63 \times \lambda/2\pi$ applies instead of the radius in the circular disk case.

In all of the foregoing example cases, one can see that by increasing the dielectric constant (e.g., by a factor of 2), one can expect to reduce the size of the ferrite (e.g., circular disk or triangle) by a factor of square root of 2, and thereby reduce the area of the ferrite by a factor of 2. As described in reference to Equation 2, thickness of the ferrite can also be reduced.

In implementations where ferrite devices are used as RF devices, sizes of such RF devices can also be reduced. For example, in a stripline device, a footprint area of the device can be dominated by the area of the ferrite being used. Thus, one can expect that a corresponding reduction in device size would be achieved. In a waveguide device, a diameter of the ferrite being used can be a limiting factor in determining size. However, a reduction provided for the ferrite diameter may be offset by the need to retain waveguide-related dimensions in the metal part of the junction.

Examples of Reduced-Size Ferrite Having Yttrium Free Garnet:

As described herein, ferrite size can be reduced significantly by increasing the dielectric constant associated with garnet structures. Also as described herein, garnets with reduced Yttrium and/or reduced non-Y rare earth content can be formed by appropriate Bismuth substitutions. In some embodiments, such garnets can include Yttrium-free or rare earth free garnets. An example RF device having ferrite devices with increased dielectric constant and Yttrium-free garnets is described in reference to FIGS. 15-17.

Figure 15A:
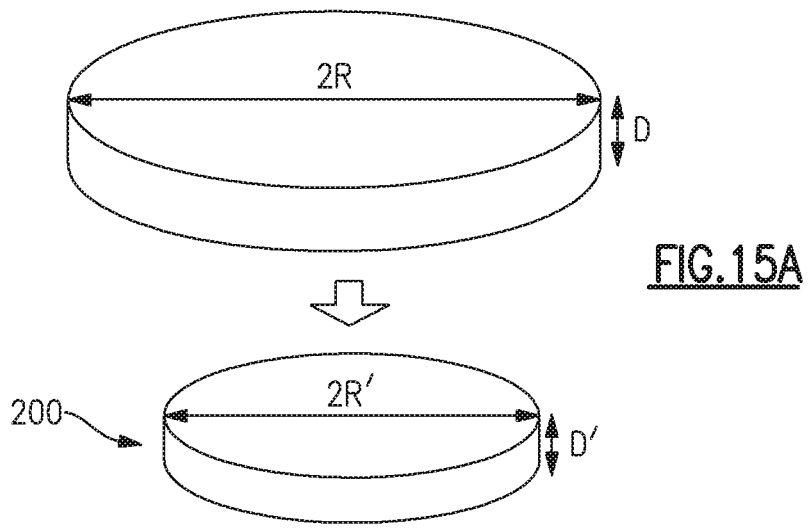
FIGS. 15A and 15B show examples of size reduction that can be implemented for ferrite devices having one or more features as described herein.
Figure 15B:
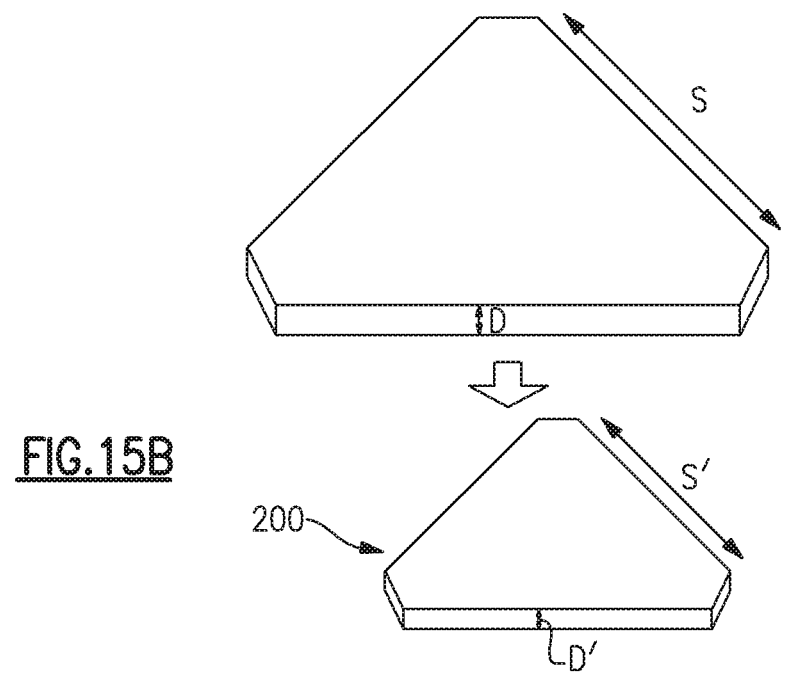

FIGS. 15A and 15B summarize the example ferrite size reductions described herein. As described herein and shown in FIG. 15A, a ferrite device 200 can be a circular-shaped disk having a reduced diameter of 2R' and a thickness of d'. The thickness may or may not be reduced. As described in reference to Equation 1, the radius R of a circular-shaped ferrite disk can be inversely proportional to the square root of the ferrite's dielectric constant. Thus, the increased dielectric constant of the ferrite device 200 is shown to yield its reduced diameter 2R'. Although described in the context of example circular and triangle shaped ferrites, one or more features of the present disclosure can also be implemented in other shaped ferrites.

To demonstrate the foregoing effect of the dielectric constant on the operating frequency (and size in some implementations), circulator (sometimes also referred to as an isolator) devices were built. One circulator was built with a current ferrite available as TransTech TTVG1200 (17.56 mm diameter, 1 mm thickness). Another circulator was built with a Yttrium free ferrite with the same dimensions. For the purpose of description, such a Yttrium free ferrite is referred to as "TTHiE1200." Each of the two example circulators has a diameter of about 25 mm.

The TTVG1200 ferrite has a Yttrium Calcium Zirconium Vanadium Iron garnet configuration, and a typical dielectric constant of approximately 14.4. The Yttrium free ferrite (TTHiE1200) has a Bismuth Calcium Zirconium Vanadium Iron garnet configuration containing not more than approximately 1% rare earth oxides, and a dielectric constant of approximately 26.73.

Figure 16A:
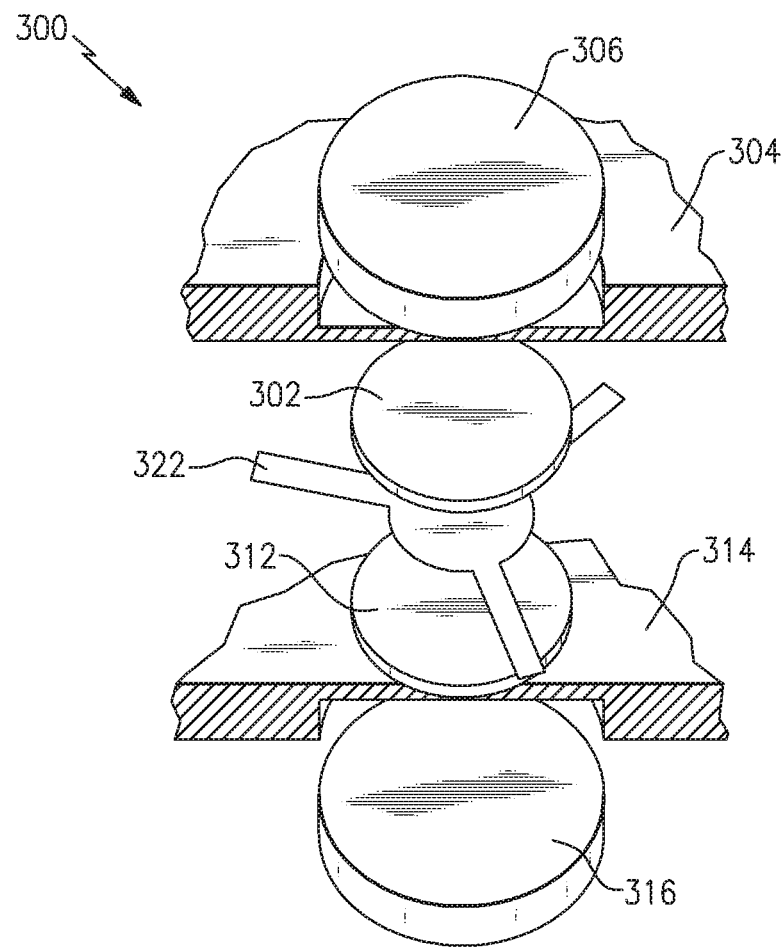
FIGS. 16A and 16B show an example circulator/isolator having ferrite devices as described herein.
Figure 16B:
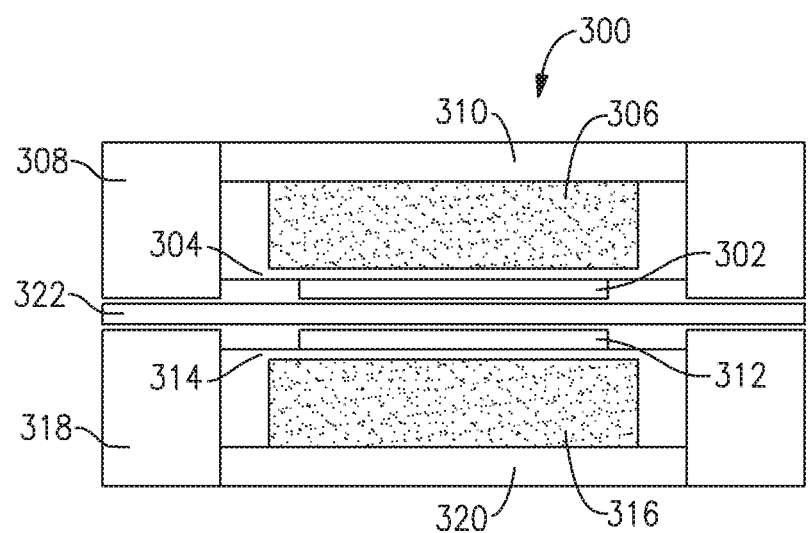

Additional details concerning the foregoing example circulators are described in reference to FIGS. 16A and 16B, in which a "ferrite" can be the first type (TTVG1200) or the second type (TTHiE1200).

FIGS. 16A and 16B show an example of a circulator 300 having a pair of ferrite disks 302, 312 disposed between a pair of cylindrical magnets 306, 316. Each of the ferrite disks 302, 312 can be a ferrite disk having one or more features described herein. FIG. 16A shows an un-assembled view of a portion of the example circulator 300. FIG. 16B shows a side view of the example circulator 300.

In the example shown, the first ferrite disk 302 is shown to be mounted to an underside of a first ground plane 304. An upper side of the first ground plane 304 is shown to define a recess dimensioned to receive and hold the first magnet 306. Similarly, the second ferrite disk 312 is shown to be mounted to an upper side of a second ground plane 314; and an underside of the second ground plane 314 is shown to define a recess dimensioned to receive and hold the second magnet 316.

The magnets 306, 316 arranged in the foregoing manner can yield generally axial field lines through the ferrite disks 302, 312. The ferrite disks can have a magnetic resonance linewidth of 11 Oe or less. The magnetic field flux that passes through the ferrite disks 302, 312 can complete its circuit through return paths provided by 320, 318, 308 and 310 so as to strengthen the field applied to the ferrite disks 302, 312. In some embodiments, the return path portions 320 and 310 can be disks having a diameter larger than that of the magnets 316, 306; and the return path portions 318 and 308 can be hollow cylinders having an inner diameter that generally matches the diameter of the return path disks 320, 310. The foregoing parts of the return path can be formed as a single piece or be an assembly of a plurality of pieces.

The example circulator device 300 can further include an inner flux conductor (also referred to herein as a center conductor) 322 disposed between the two ferrite disks 302, 312. Such an inner conductor can be configured to function as a resonator and matching networks to the ports (not shown).

Figure 17:
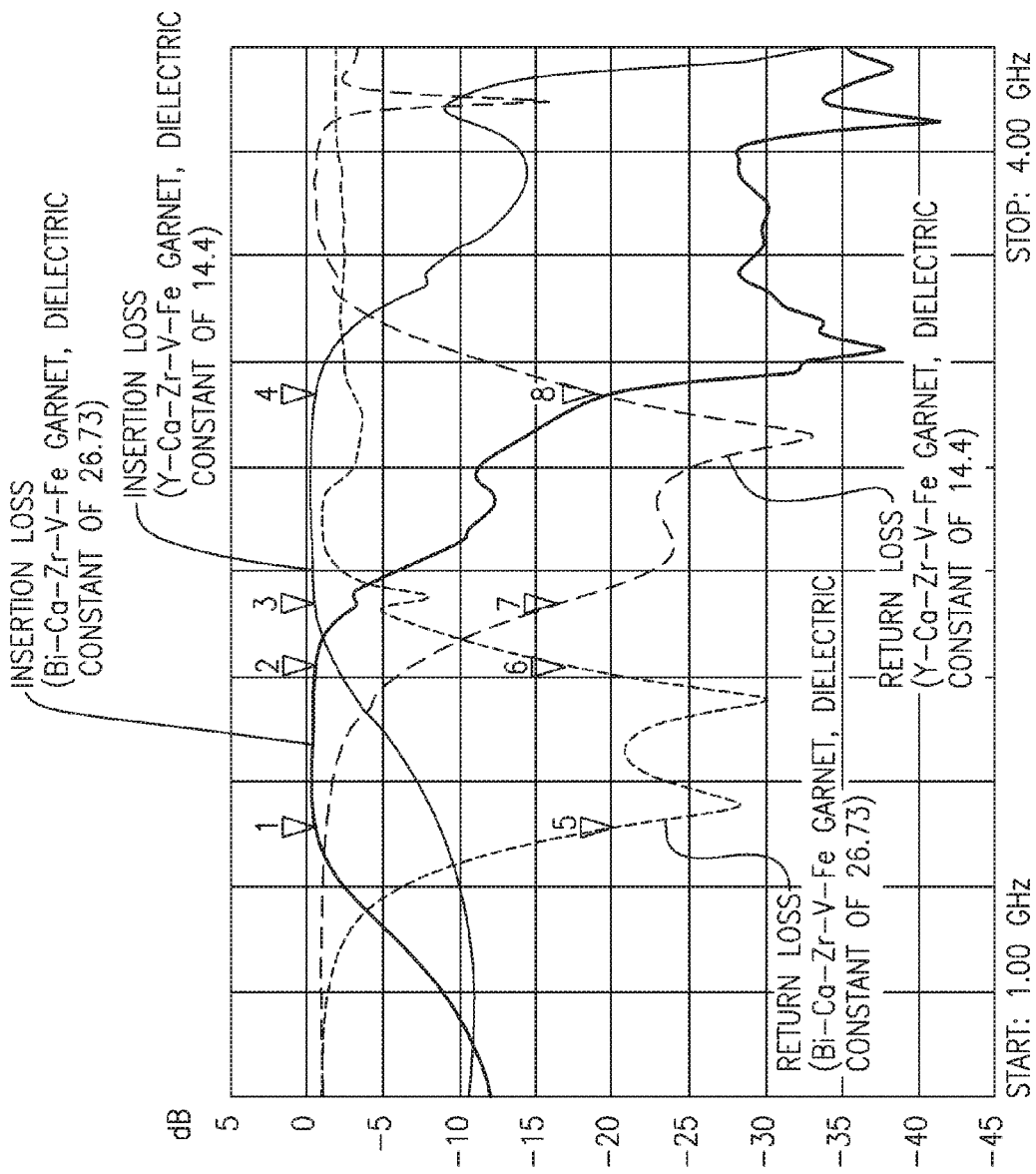
FIG. 17 shows insertion loss plots and return loss plots for two example 25 mm circulators, where one is based on a YCaZrVFe garnet system with dielectric constant of 14.4, and another is based on a Yttrium free BiCaZrVFe garnet system with dielectric constant of 26.73.

FIG. 17 shows insertion loss plots and return loss plots for the two above-described 25 mm circulators (based on the TTVG1200 ferrite (YCaZrVFe garnet, dielectric constant of 14.4), and based on the Yttrium free ferrite (TTHiE1200) (BiCaZrVFe garnet, dielectric constant of 26.73)).

Figure 18A:
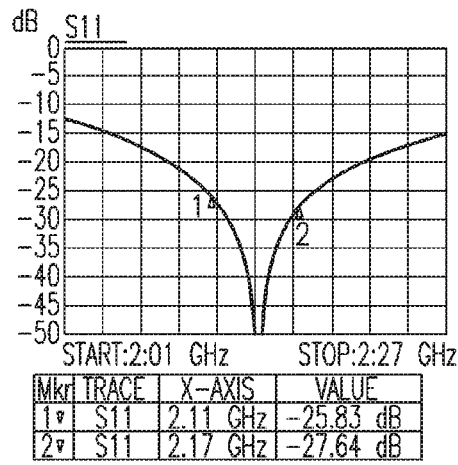
FIGS. 18A and 18B show s-parameter data for an example 10 mm circulator device having the high-dielectric Yttrium free BiCaZrVFe garnet system of FIG. 17.
Figure 18A:
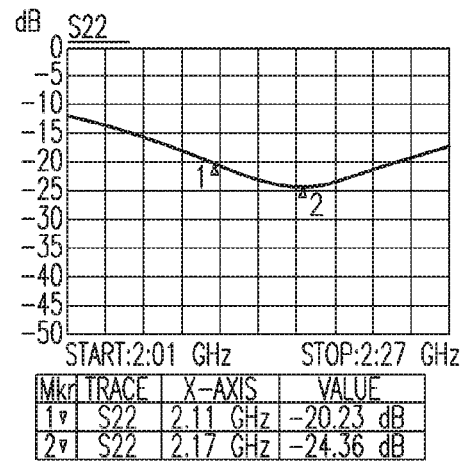
Figure 18A:
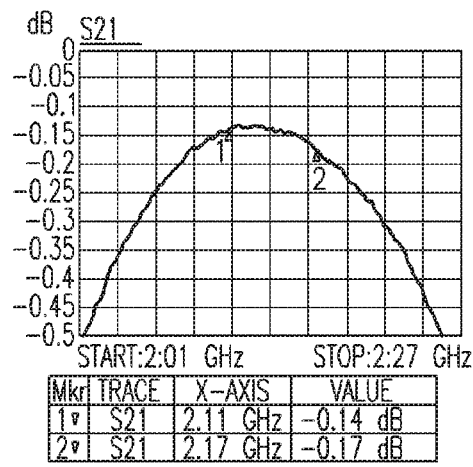
Figure 18A:
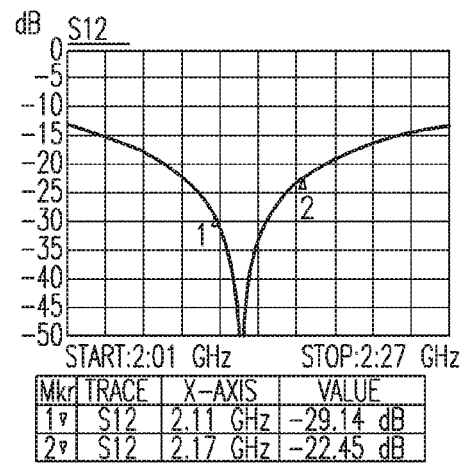
Figure 18B:
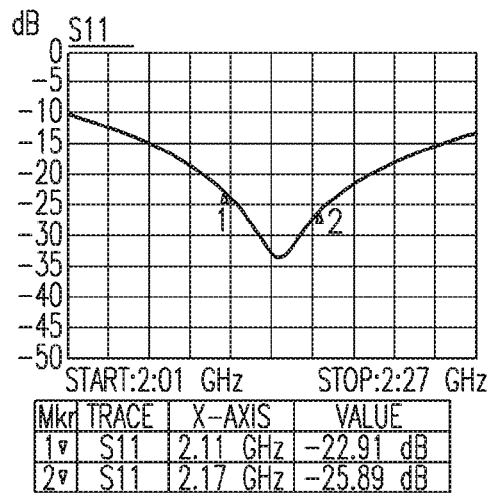
Figure 18B:
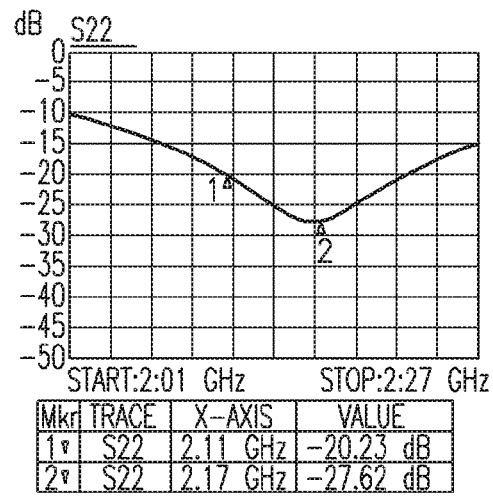
Figure 18B:
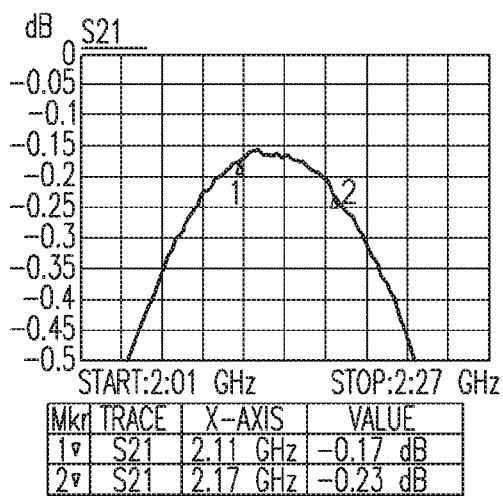
Figure 18B:
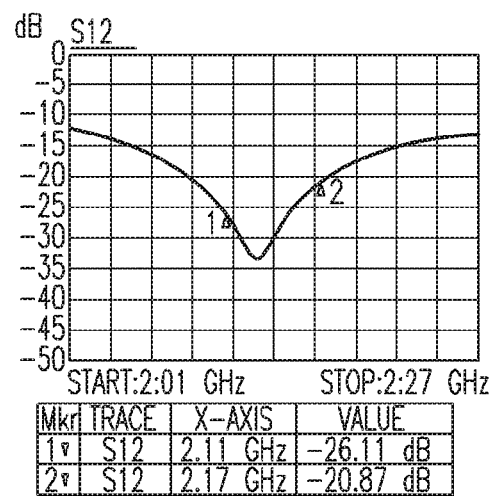

To further characterize the TTHiE1200 ferrite as described herein, a smaller 10 mm circulator was made using a TTHiE1200 ferrite disk (radius of approximately 7.00 mm, thickness of approximately 0.76 mm). FIGS. 18A and 18B show s-parameter data for the 10 mm device at operating temperatures of 25° C. and 100° C., respectively. Intermodulation measurements were also made for the 10 mm device at 25° C. Based on FIGS. 18A and 18B, one can see that the s-parameter data appears to be generally positive. Based on Table 4, IMD performance is generally what is expected for this size package. For example, typical IMD performance for a 20 mm device is about −70 dBc, and about −60 dBc for a 15 mm device.

Figure 19:
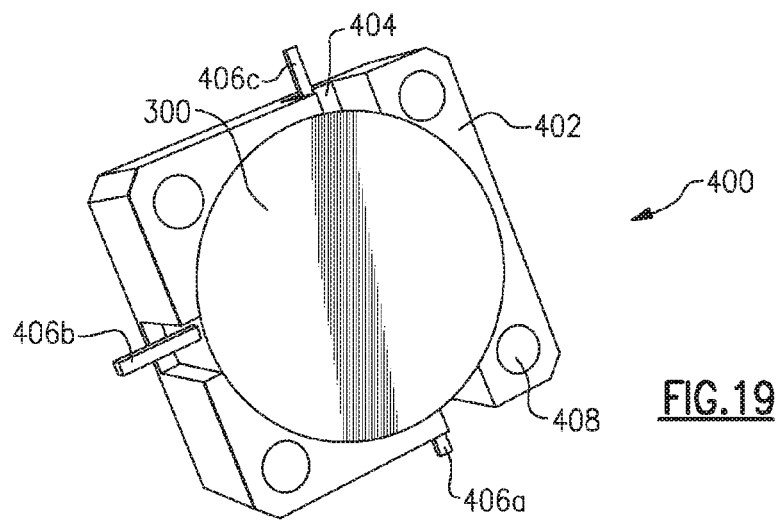
FIG. 19 shows an example of a packaged circulator module.

In some embodiments, ferrite-based circulator devices having one or more features as described herein can be implemented as a packaged modular device. FIG. 19 shows an example packaged device 400 having a circulator device 300 mounted on a packaging platform 404 and enclosed by a housing structure 402. The example platform 404 is depicted as including a plurality of holes 408 dimensioned to allow mounting of the packaged device 400. The example packaged device 400 is shown further include example terminals 406a-406c configured to facilitate electrical connections.

In some embodiments, a packaged circulator/isolator such as the example of FIG. 19 can be implemented in a circuit board or module. Such a circuit board can include a plurality of circuits configured to perform one or more radio-frequency (RF) related operations. The circuit board can also include a number of connection features configured to allow transfer of RF signals and power between the circuit board and components external to the circuit board.

Figure 20:
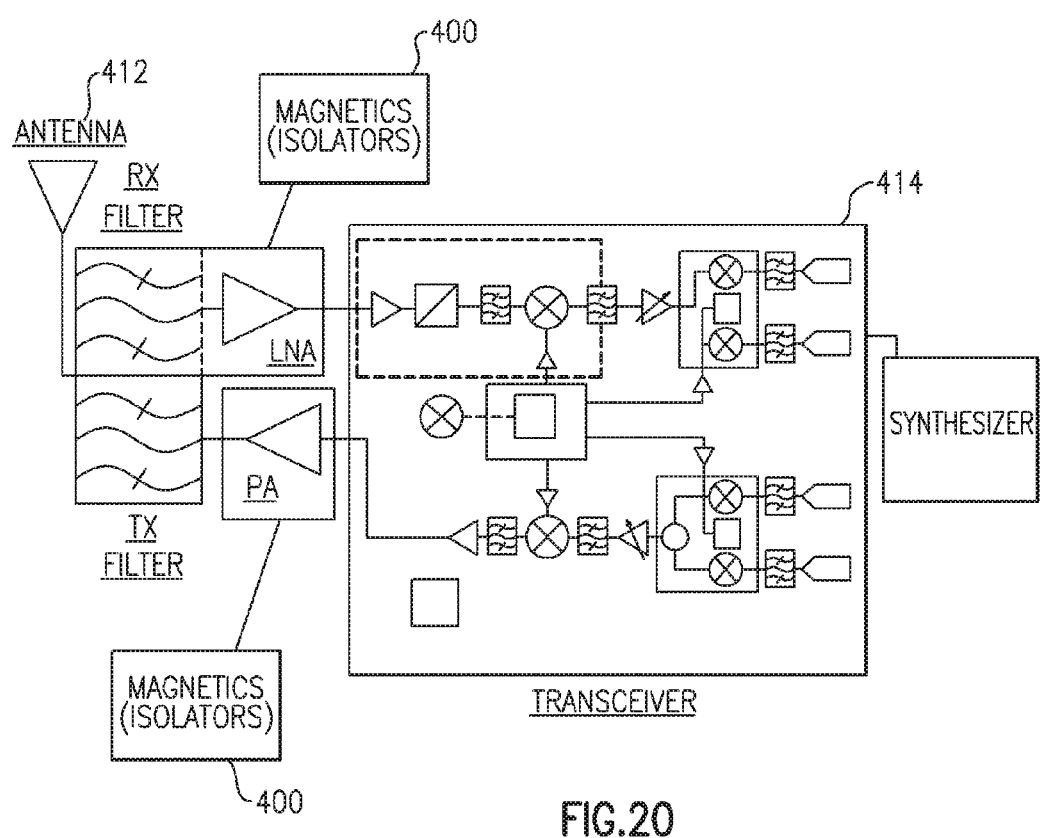
FIG. 20 shows an example RF system where one or more of circulator/isolator devices as described herein can be implemented.

In some embodiments, the foregoing example circuit board can include RF circuits associated with a front-end module of an RF apparatus. As shown in FIG. 20, such an RF apparatus can include an antenna 412 that is configured to facilitate transmission and/or reception of RF signals. Such signals can be generated by and/or processed by a transceiver 414. For transmission, the transceiver 414 can generate a transmit signal that is amplified by a power amplifier (PA) and filtered (Tx Filter) for transmission by the antenna 412. For reception, a signal received from the antenna 412 can be filtered (Rx Filter) and amplified by a low-noise amplifier (LNA) before being passed on to the transceiver 414. In the example context of such Tx and Rx paths, circulators and/or isolators 400 having one or more features as described herein can be implemented at or in connection with, for example, the PA circuit and the LNA circuit. In some embodiments, circuits and devices having one or more features as described herein can be implemented in RF applications such as a wireless telecommunication base-station.

Isolator/Circulator Junctions Having Impedance Matching

As described herein, ferrite devices having garnets with reduced or no rare earth content can be configured to include a high dielectric constant property. Various design considerations concerning impedance matching as applied to RF applications are now described. In some implementations, such designs utilizing garnets with high dielectric constants may or may not necessarily involve rare earth free configurations as described above. Thus, some embodiments of the disclosed impedance matching designs may use standard RF materials known in the art.

Figure 21:
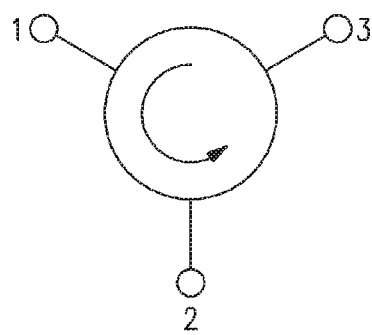
FIG. 21 shows a schematic of a circulator/isolator junction.

As mentioned above, isolator and circulator junctions are commonly used in conjunction with microwave and/or radio frequency signaling, though they can be used in other applications as well. Typically, the junctions are passive, non-reciprocal three or four port devices, though the particular number of ports is not limiting. FIG. 21 illustrates a basic example of such a junction having ports 1, 2, and 3. These ports are points in which an external waveguide or transmission line connects to the device, such as discussed with respect to FIG. 16A above. In some embodiments, when a signal enters into one of the ports, in either a circulator or an isolator, the signal is directed to output at an adjacent port.

Isolators and circulator junctions can generally have the same physical appearance, but are used for different purposes in RF applications. Typically, the difference between an isolator and a circulator junction is the number of open or closed ports. For example, in a three-port configuration of a junction, such as shown in FIG. 21, when all ports are open the junction is considered a circulator. Therefore, when a signal enters the circulator through a port, it would exit the adjacent port. For example, in the configuration of FIG. 21, if a signal entered port 2, it would exit out port 3.

As described herein, terms "circulator" and "isolator" can be used interchangeably or separately, depending on applications as generally understood. For example, circulators can be passive devices utilized in RF applications to selectively route RF signals between an antenna, a transmitter, and a receiver. If a signal is being routed between the transmitter and the antenna, the receiver preferably should be isolated. Accordingly, such a circulator is sometimes also referred to as an isolator; and such an isolating performance can represent the performance of the circulator.

On the other hand, in a three-port configuration where one of the ports is terminated (such as port 3 in FIG. 21), the junction would be considered an isolator junction as a signal can travel only in one direction between the remaining ports. Typically, the isolator junction can be used to shield equipment on the input side from the effects of conditions on the output size, for example preventing a microwave source from being detuned by a mismatch load.

Figure 22:
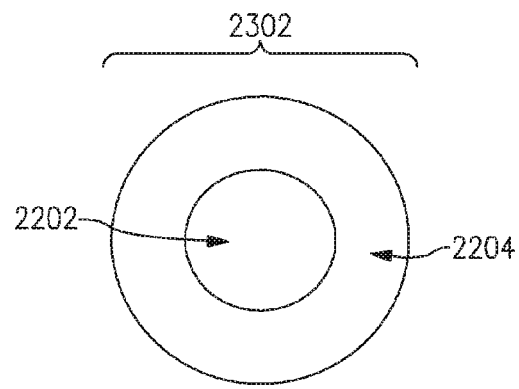
FIG. 22 shows an embodiment of a circulator/isolator junction of the prior art.

FIG. 22 illustrates a junction 2302 configuration that is typically used in the prior art. As shown, the junction 2302 is generally made up of two different portions. There is the inner ferrite disk 2202 and the outer single material dielectric ring 2204. The function of the dielectric ring 2204 can depend on the type of junction. For example, it may be used to 1) magnetically separate the ferrite 2202 from the body of the isolator/circulator to improve intermodulation while maintaining resonant frequency, 2) carry the impedance transformer formed by the center conductor and its surrounding dielectric as part of the matching circuit, or 3) with the center conductor (discussed below), connect the external, typically 50 ohm, circuitry with the junction of the ferrite device. However, these are merely examples of uses for the dielectric, and they are not limiting.

Figure 23:
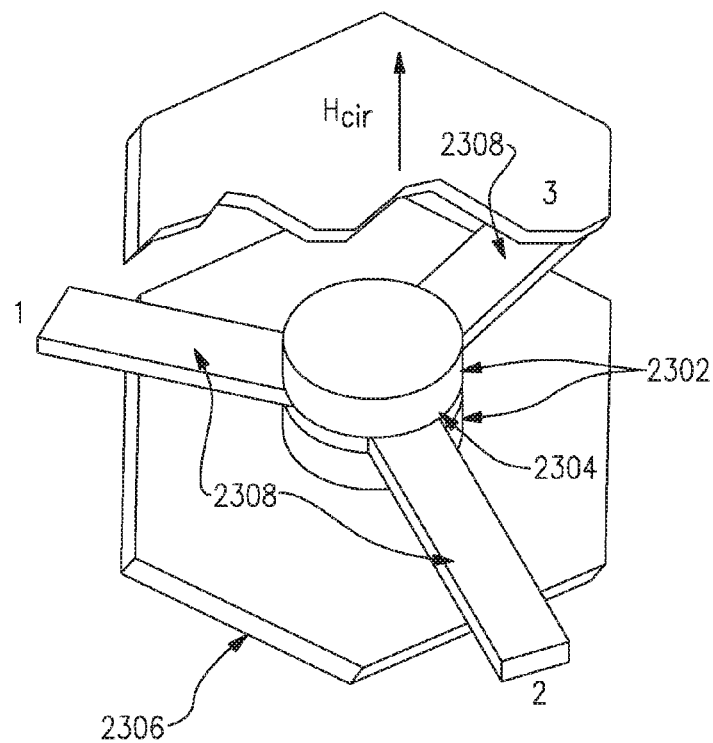
FIG. 23 shows an exploded view of an embodiment of a circulator/isolator junction having a center conductor and transmission lines.

FIG. 23 illustrates a view of a stripline tri-plate configuration wherein two of the junctions 2302 discussed with respect to FIG. 22 sandwich a center conductor 2304. The junction 2302 and conductor 2304 assembly is then inserted within a pair of ground plates 2306, so the ground plates 2306 are on opposite side of the assembly (shown in the side view of FIG. 25). The center conductor 2304 has transmission lines 2308 extending away from the center of the assembly, the transmission lines 2308 configured to direct signals into and out of the ports of the junction 2302. The dielectric ring 2204 portions of the junction 2302 can provide for impedance and transformer matching with the transmission lines 2308. In some embodiments, the disclosed device can be used with micro-strip transmission lines. The micro-strip transmission lines can be easy to integrate into amplifiers.

Figure 24:
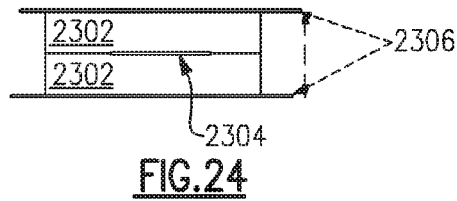
FIG. 24 shows a side viewpoint of an embodiment of a circulator/isolator junction.

FIG. 24 shows a side view of a configuration of an isolator/circulator junction with a center conductor 2304. As shown, there is a ground plate 2306, junction 2302, conductor 2304, junction 2302, ground plate 2306 configuration.

The center conductor 2304 can be formed from copper, or other similar highly conductive material, in sheet or foil form. The type of material, and the general shape of the material is not limiting. The center conductor 2304 can have a thickness from about 0.1 to about 0.25 mm, though the thickness is not limiting, and different thicknesses can be used for different purposes. The width of the transmission line 2308 of a center conductor 2304, for a given impedance, is determined by the ground plate 2306 spacing and the dielectric constant of the junctions 2302 surrounding the conductor 2304. For a fixed spacing and impedance, the width of the transmission line 2308 is proportional to the inverse square root of the dielectric constant of the dielectric ring 2204. Therefore, as the dielectric constant increases, the width of the transmission line 2308 must decrease in order to have sufficient impedance and transformer balancing (e.g., impedance matching). This can be a significant factor during miniaturization, where small changes in dimensions of the transmission line 2308 can have a large effect on the performance of the junction. Using the prior art, it can be difficult, if not impossible, to achieve proper miniaturization due to manufacturing constraints, discussed below.

Figure 25:
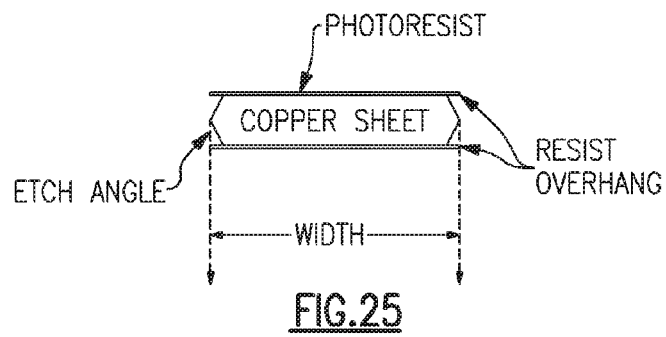
FIG. 25 shows an embodiment of a transmission line during etching processes.

The center conductor 2304 in a tri-plate device is typically made by photolithography, NC milling using conventional cutting tools, water pressure jets, or laser cutting, though the exact method is not limiting. However, photolithography is the most common procedure used for miniaturized RF components. Typically, a double sided lithography approach is used, which is shown in FIG. 25. Generally, an etchant is applied to both sides of the center conductor 2304, which creates a characteristic etch angle. Because of the etch angle, the lithography process is limited to the accuracy of the resulting linear dimensions, depending on the thickness of the copper. As shown in FIG. 25, while the copper sheet technically extends to the required width shown, this only occurs at a single point, or a small amount of points. When miniaturized sizes of components are used, this can have significant effects on the integrity of the final center conductor 2304. Further, the dimensional accuracy also depends on stopping the etching process at the moment the copper is cut through at the required width. Any longer will reduce the width of the copper, which can become significant in the millimeter or sub-millimeter sizes. Therefore, there are mechanical tolerances in the lithography process that prevents further miniaturization of the copper conductor.

While using the junctions 2302 of FIG. 21 provides adequate performance for larger circulator/isolator junctions, as the devices become smaller, the prior art junctions 2302 will not be able to be used, mainly due to mechanical constraints on the formation of the center conductor 2304. Accordingly, the junctions used in the prior art, as shown in FIG. 22, are not adequate for the miniaturization process. For isolator/circulator applications, size reduction can be implemented using high dielectric constant dielectric/ferrite materials. As mentioned above, as the dielectric constant of the material increases, the width of the transmission line needs to decrease. However, there are significant limitations in further decreasing the width of the transmission lines due to the lithography process, and millimeter or sub-millimeter width transmission lines are technically unfeasible as the etching process is less capable of achieving the necessary mechanical, and hence impedance, accuracy. Basically, these small widths are very close to the etching process tolerances, and hence the resulting impedance tolerances. Accordingly, prior art junctions typically have a dielectric constant of at a maximum of 30, as the center conductors of the corresponding dimensions are too fragile and cannot hold the necessary impedance accuracy for commonly used impedances and ground plane/ferrite thicknesses. Therefore, because of the low dielectric constant that is needed in the prior art junctions, the prior art junctions are not suitable for miniaturization.

FIGS. 26A-D illustrate an embodiment of a circulator/isolator junction that can provide for advantageous improvements over those currently in use. Generally, high dielectric constant material, such as those described in detail above, can be incorporated into embodiments of the circulator/isolator junction while still maintaining transmission line widths that are within the tolerance ranges of current processing techniques, such as photolithography. Embodiments of the disclosed junction can therefore be used for further miniaturization of RF and electronic components, while still maintaining adequate impedance and transformer matching, thereby maximizing power transfer and or minimizing signal reflection.

In some embodiments, a segmented composite dielectric ring can be used to surround a ferrite disc, thereby replacing the single material ring structure around the ferrite center disc typically used for forming isolator/circulator junctions of the prior art (shown in FIG. 22). Specifically, low dielectric constant material segments can be formed over the transmission lines, whereas high dielectric constant material segments can be formed between the low dielectric constant material segments. If a low dielectric constant material is used only around the transmission lines of the center conductor, thus allowing for a wider transmission line conductor width, but very high dielectric constant dielectric material is used around the rest of the ferrite, the size of the overall composite ferrite/dielectric assembly can be reduced relative to an assembly having only ferrite and a low dielectric constant dielectric material. Therefore, miniaturization can occur that can further reduce the size of the electronics, a feat which could not occur when using only ferrite and low dielectric constant material. Further, the inclusion of the low dielectric segments has little, if any, effect in changing the frequency of the junction, depending on their area relative to the high dielectric constant area. Thus, miniaturization can occur without significant, if any, RF property losses.

Figure 26A:
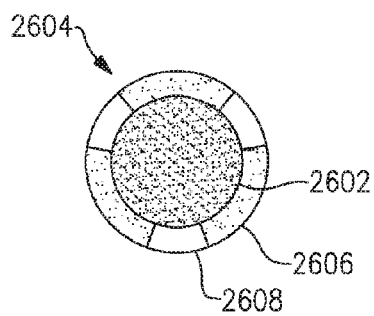
FIGS. 26A-D shows an embodiment of the disclosed circulator/isolator junction having both high and low dielectric constant materials.

FIG. 26A illustrates an embodiment of such a segmented junction. As shown in FIG. 26A, the junction can contain a high dielectric constant ferrite center disc 2602. This disc 2602 can be, for example, ferrite, though other magnetic materials known in the art can be used as well. The disc 2602 can be surrounded by a composite assembly 2604 having a ring structure and configured to generally encircle the disc 2602. The assembly 2604 can have a shape generally the same as that shown in FIG. 22, and thus the prior art, though the general shape of the assembly is not limiting.

In some embodiments, as shown in FIG. 26A, the assembly 2604 (e.g., junction) can be formed from a plurality of different dielectric segments. For example, the assembly 2604 can be formed having high dielectric constant material segments 2606 and low dielectric constant material segments 2608. In some embodiments, the low dielectric constant material segments 2608 can be positioned so that they line up and cover the transmission lines of the center conductor, such as those shown in FIG. 22. In some embodiments, the low dielectric constant material segments 2608 can be substantially the same width as the transmission line. In some embodiments, the low dielectric constant material segments 2608 can have a width less than the width of the transmission line. In some embodiments, the low dielectric constant material segments 2608 can have a width greater than the width of the transmission line. The high dielectric constant material segments 2606 can form the rest of the assembly 2604. The size and shape of the segments is not otherwise limited. In some embodiments, the number of low dielectric constant material segments 2608 can be equal to the number of open ports. For example, a circulator junction may have two low dielectric constant material segments 2608 whereas an isolator junction may have three low dielectric constant material segments 2608. However, the number of low and high dielectric constant material segments 2608 is not limiting, and any number of low and high dielectric constant material segments 2608 can be used. In some embodiments, more than two different dielectric constant materials can be used around the disc 2602.

Figure 26B:
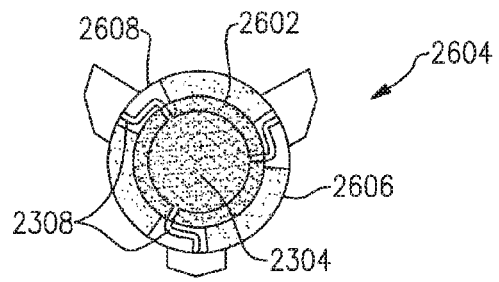

FIG. 26B shows a cut-out view of the assembly 2604 with the transmission lines 2308 passing through the low dielectric constant material segments 2608 to meet the conductor 2304. Thus, as shown, the low dielectric constant material segments 2608 can cover the transmission lines 2308, whereas the high dielectric constant material segments 2606 are formed away from the transmission lines 2308.

Figure 26C:
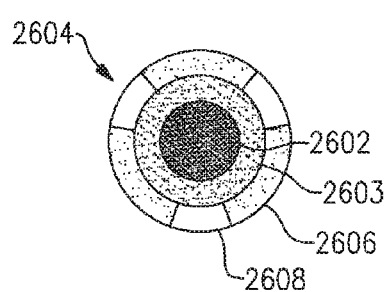

FIG. 26C illustrates an embodiment having a ferrite disc 2602 and an outer ferrite ring 2603. These disc 2602 and ring 2603 can be formed of different materials or can be formed of the same material. A similar segmented rings structure can still be used with this embodiment, as shown in FIG. 26C. Having the different materials in the center can further adjust the dielectric constant of the material.

Figure 26D:
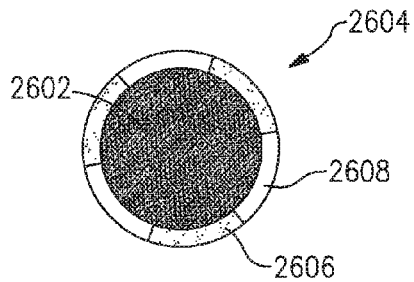

FIG. 26D illustrates another embodiment of a junction 2604 having a substantially larger ferrite disc 2602 as compared to the outer ring. However, the particular dimensions of each of the portions is not limiting.

In some embodiments, the low dielectric constant material segments 2608 can be about 0.5, 1%, 2%, 3%, 5%, 10% 15%, 20% wider than the transmission lines. In some embodiments, the low dielectric constant material segments 2608 can be greater than about 0.5, 1%, 2%, 3%, 5%, 10% 15%, or 20% wider than the transmission lines. In some embodiments, the low dielectric constant material segments 2608 can be less than the width of the transmission lines.

In some embodiments, the low dielectric constant material segments 2608 can be about 0.5, 1%, 2%, 3%, 5%, 10% 15%, 20% thinner than the transmission lines. In some embodiments, the low dielectric constant material segments 2608 can be greater than about 0.5, 1%, 2%, 3%, 5%, 10% 15%, or 20% thinner than the transmission lines. In some embodiments, the low dielectric constant material segments 2608 can be less than about 0.5, 1%, 2%, 3%, 5%, 10% 15%, or 20% thinner than the transmission lines.

In some embodiments, the assembly 2604 can contain 1, 2, 3, 4, 5, or 6 low dielectric constant material segments 2608, and the number of low dielectric constant material segments is not limiting. Preferably, the low dielectric constant material segments 2608 are positioned symmetrically around the disc 2602. For example, the low dielectric constant material segments 2608 can be spaced generally 120 degrees apart if three low dielectric constant material segments 2608 are used. However, in some embodiments the low dielectric constant material segments 2608 may not be positioned symmetrically. In some embodiments, such as in an isolator junction, low dielectric constant material segments 2608 do not need to cover the blocked port. In some embodiments, such as in an isolator junction, low dielectric constant material segments 2608 can cover the blocked port.

Examples of low dielectric constant materials that could be used are mixed magnesium titanate/calcium titanate ceramic dielectrics which are varied in dielectric constant by increasing the % of calcium titanate in the mixture. These are commercially available, for example Trans-Tech's MCT series. Other silicates, aluminates, titanates, stannates, zirconates, molybdates, tungstates, niobates and tantalates or combinations thereof, used in combination with Group 1, 2, or 3 elements of the periodic table can be used to make similar dielectrics. Additionally, any of the above ceramic compositions and any of their elemental oxides, nitrides, or flourides can be incorporated into a polymer composite to form similar dielectric constants, for example Emerson and Cuming's HiE series composites, or composite laminates used as printed circuit material. However, the type of dielectric material is not limiting.

Examples of some high dielectric materials that could be used are found in the above disclosure, as well as International Patent Applications WO 2012082642, WO 2012170259, WO 2011075123, hereby incorporated by reference in their entirety. Specifically, these materials can be mixed magnesium titanate/calcium titanate ceramic dielectrics which are varied in dielectric constant by increasing the % of calcium titanate in the mixture. These are commercially available, for example Trans-Tech's MCT series. Other silicates, aluminates, titanates, stannates, zirconates, molybdates, tungstates, niobates and tantalates or combinations thereof, used in combination with Group 1, 2, or 3 elements of the periodic table, and any rare element from the rare earth (14f) series plus yttrium can be used to make similar dielectrics. Additionally, any of the above ceramic compositions and any of their elemental oxides, nitrides, or flourides can be incorporated into a polymer composite to form similar dielectric constants, for example Emerson and Cuming's HiE series composites, or composite laminates used as printed circuit material. However, the type of dielectric material is not limiting.

In some embodiments, the different dielectric constant segments 2506/2508 can be swapped in an out as needed. In some embodiments, the assembly 2604 is formed so that the segments 2506/2508 cannot be removed and replaced. In some embodiments, the segments 2506/2508 can be bonded together using, for example, adhesives and glues, though the type of attachment between the segments 2506/2508 is not limiting. In some embodiments, the assembly 2604 can be held together by frictional, or other mechanical forces such as mating pieces, interacting between the segments 2506/2508. In some embodiments, co-firing can be used, where mechanical shrinkage and/or inter-diffusion of dielectrics and/or ferrite can lead to the segments 2506/2508 attaching to one another. U.S. Pat. Nos. 7,687,014 and 8,282,763, hereby incorporated by reference in their entirety, disclose some non-limiting examples for attaching the segments together through co-firing and/or gluing.

In some embodiments, the low dielectric constant material segments 2608 may be formed completely through the thickness of the high dielectric constant material segments 2606, so they may be exposed to the outside of the assembly 2604. In some embodiments, the low dielectric constant material segments 2608 may only partially pass through the thickness of the high dielectric constant material segments 2606 and can, for example, be enclosed within the high dielectric constant material segments 2606 on the top side, bottom side, or both sides. In some embodiments, the low dielectric constant material segments 2608 may be formed completely through the width of the high dielectric constant material segments 2606. In some embodiments, the low dielectric constant material segments 2608 may be formed partially through the width of the high dielectric constant material segments 2606. Accordingly, there may be high dielectric constant material segments 2608 on either the inner or outer diameter of the low dielectric constant material segments 2604.

In some embodiments, the entire ring may be formed from a high dielectric material. However, a low dielectric constant material could be coated around portions of the ring, forming a similar structure as shown in FIG. 26A. For example, the low dielectric constant material could be coated as a liquid or solid, which could then be cured to adhere to the high dielectric material, or could be a composite that could be sintered onto the high dielectric constant material. The method of applying the low dielectric constant material is not limiting.

In some embodiments, the assembly 2604 may not be formed out of discrete segments such as those shown in FIG. 26A. For example, the assembly 2604 could be formed as one piece, having a transition between high and low dielectric constant materials similar to that shown in FIG. 26A. In some embodiments, the assembly 2604 may gradually transition from low to high dielectric constant material, thus forming a gradient throughout the assembly 2604.

In some embodiments, the low dielectric constant material may be checker boarded throughout the high dielectric constant material. Therefore, the low dielectric constant material may not form the bands as shown in FIG. 26A, but may instead be found throughout the assembly 2604. The checkerboard could be randomly formed, or there could be specific patterns. While an analogy is made to a checkerboard, the low dielectric constant material segments could be formed of different shapes and sizes, such as circles or triangles. Further, the size of the segments may vary throughout the assembly 2604.

In some embodiments, 4 or 6 port circulation modes can be used, accordingly with 4 or 6 center conductor "arms," and therefore 4 or 6 low dielectric segments would be used as well.

In some embodiments, the transmission lines can include one or more transformer sections. In some embodiments, a second transformer can be added into the center conductor. This second ferrite material can have a lower impedance than the first ferrite material. In some embodiments, the second ferrite material can be nearer to the ferrite interference, thereby giving greater bandwidth. In some embodiments, this second ferrite material could be inserted into either the high or low dielectric constant segments.

In some embodiments, the assembly 2604 can have an outer diameter of about 5, 10, 15, 20, 25, 30, 35, 40, 45, 50, 100, 150, or 200 mm. In some embodiments, the assembly 2604 can have an outer diameter of less than about 5, 10, 15, 20, 25, 30, 35, 40, 45, 50, 100, 150, or 200 mm. In some embodiments, the ferrite disc 2502 can have an outer diameter of about 1, 3, 5, 10, 15, 20, 25, or 30 mm.

In some embodiments, the low dielectric constant material segments 2508 can have a width of about 0.1, 0.3, 0.5, 0.7, 1.0, 1.5, 2.0, or 2.5 mm. In some embodiments, the low dielectric constant material segments 2508 can have a width of less than about 0.1, 0.3, 0.5, 0.7, 1.0, 1.5, 2.0, or 2.5 mm. In some embodiments, the low dielectric constant material segments 2508 can have an upper surface area of about 3, 4, 5, 6, 7, 7.5, 8, 9, 10, 11, 12, 13, or 15 sq. mm. In some embodiments, the low dielectric constant material segments 2508 can have an upper surface area of less than about 3, 4, 5, 6, 7, 7.5, 8, 9, 10, 11, 12, 13, or 15 sq. mm.

While the above disclosed dimensions could be used with embodiments of the disclosed device, the device is not limited to these specific dimensions, and other dimensions, especially for different frequency ranges, can be used as well.

In some embodiments, the low dielectric constant material can have a dielectric constant of about 10, 14, 15, 20, or 30. In some embodiments, the low dielectric constant material can have a dielectric constant of less than about 30, 20, 15, 14, or 10. In some embodiments, the low dielectric constant material can have a dielectric constant greater than about 14 to 30.

In some embodiments, the high dielectric constant material can have a dielectric constant of about 30, 50, 100, 150, 200, 250, or 300. In some embodiments, the high dielectric constant material can have a dielectric constant of greater than about 30, 50, 100, 150, 200, 250, or 300. In some embodiments, the high dielectric constant material can have a dielectric constant of less than about 30, 50, 100, 150, 200, 250, or 300.

In some embodiments, the addition of the low dielectric constant material segments 2608 into the high dielectric constant material segments 2606 can have a minimal effect in the physical properties of the assembly 2604. In some embodiments, the effective change in capacitance, as a ratio between a fully dielectric ring and embodiments of the disclosed ring, can be about 1.000, 1.005, 1.010, 1.0141, 1.020, or 1.030. In some embodiments, the effective change in capacitance, as a ratio between a fully dielectric ring and embodiments of the disclosed ring, can be less than about 1.005, 1.010, 1.0141, 1.020, or 1.030. In some embodiments, the effective change in frequency, as a ratio between a fully dielectric ring and embodiments of the disclosed ring, can be about 1.001, 1.002, 1.003, 1.004, 1.005, 1.006, 1.007, 1.008, 1.009, or 1.010. In some embodiments, the effective change in frequency, as a ratio between a fully dielectric ring and embodiments of the disclosed ring, can be less than about 1.001, 1.002, 1.003, 1.004, 1.005, 1.006, 1.007, 1.008, 1.009, or 1.010.

Embodiments of the disclosed junctions can be advantageous over those previously used as the resulting device structures can be much smaller while still maintaining impedance matching. They can be particularly useful in broadband devices for use in 4th or higher generation carrier aggregation applications, where existing above-resonance devices do not have the required bandwidth. Existing below-resonance devices, while having sufficient bandwidth, are too large for the transceivers currently being considered.

In some embodiments, the disclosed circulator/isolator junction can be incorporated into different RF components. For example, the junction can be incorporated into transceivers. In some embodiments, this can allow for greater carrier aggregation, thereby allowing for greater bandwidths to be used. In some embodiments, bandwidths of 1.8-2.7 GHz can be used. Further, embodiments of the disclosed junction can be used in above resonance techniques. In some embodiments, the circulator/isolator junctions are located in front of amplifiers to prevent the reflection of signal. In other embodiments, it may be used between amplifier stages, but is not limited to any position in the transceiver.

Figure 27:
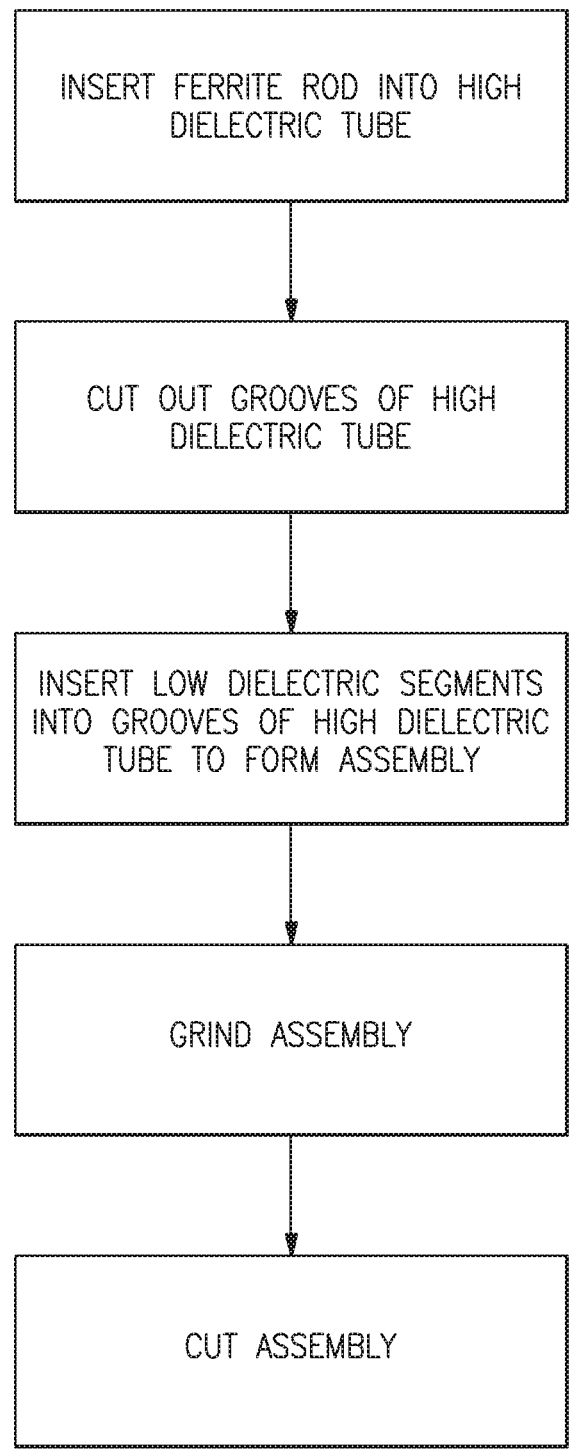
FIG. 27 shows an embodiment of a method of forming a disclosed circulator/isolator junction having both high and low dielectric constant materials.
Figure 28A:
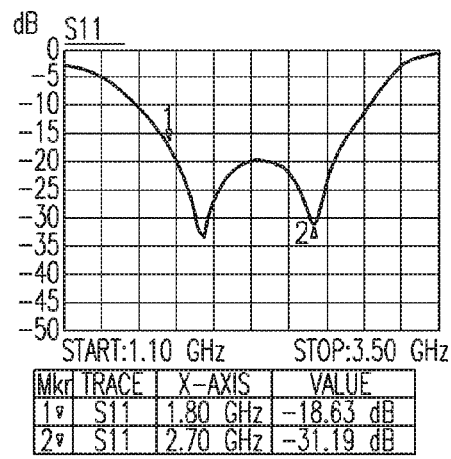
FIGS. 28A-D show s-parameter data of a below resonance broadband device using embodiments of the disclosed circulator/isolator junction.
Figure 28B:
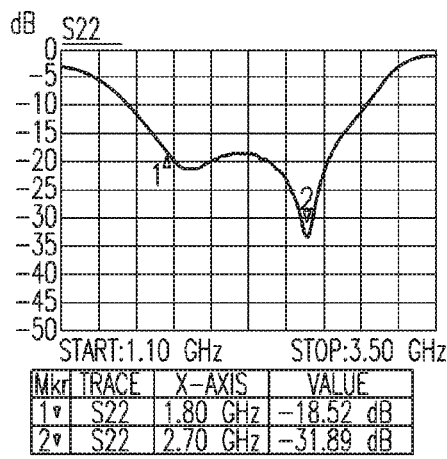
Figure 28C:
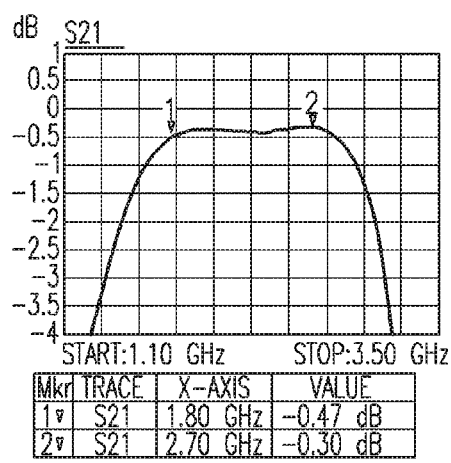
Figure 28D:
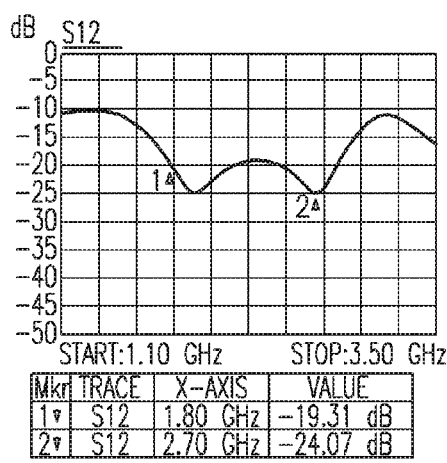

FIG. 27 illustrates a method for making an embodiment of the isolator/circulator junction described above having low dielectric constant material segments inserted into high dielectric constant material. In some embodiments, a ferrite rod can be fitted inside a tube of a high dielectric constant material 2702. Grooves can then be cut into the dielectric tube through to the ferrite rod 2704. This cutting can be performed though, for example, water cutting, laser cutting, mechanical cutting, wire cutting, or other cutting methods, and the procedure for cutting the grooves is not limiting. Further, as described above, any number of grooves can be made into the tube. After the grooves are formed, segments of low dielectric constant material can then be fitted into the grooves 2706. Once fitted together, the whole assembly can be ground to any desired outer diameter, and then cut into slices to any desired thickness 2708. In some methods, the segment may be made separately from the ferrite by using a tube or ring cut into segments, then combined with other segments of the same or different dielectrics to form a tube or ring, into which a ferrite disk or tube may be inserted before final grinding or slicing to the desired thickness. In some embodiments, the different separate sections can be attached to the ferrite rod, for example by gluing, to form a ring around the rod. In some embodiments, two different tubes of different dielectric material (e.g., one having high dielectric constant and the other having low dielectric constant) can be segmented lengthwise, such as by using a wire saw to slice the tubes along their length, and alternating segment lengths can be attached to a garnet rod to form the ring.

FIGS. 28A-D show s-parameter data for embodiments of the above disclosed segmented junction at 1.8 to 2.7 GHz. As shown, the segmented junction can have advantageous RF properties. For example, as shown in FIGS. 28A-D, the segmented junction can have a wide resonant frequency range, including an advantageous range around 2.7 GHz, allowing the junction to be used in high frequency applications.

Processing

FIGS. 29-33 illustrate processes for fabricating ferrite devices having one or more features as described herein. FIG. 39 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

Figure 29:
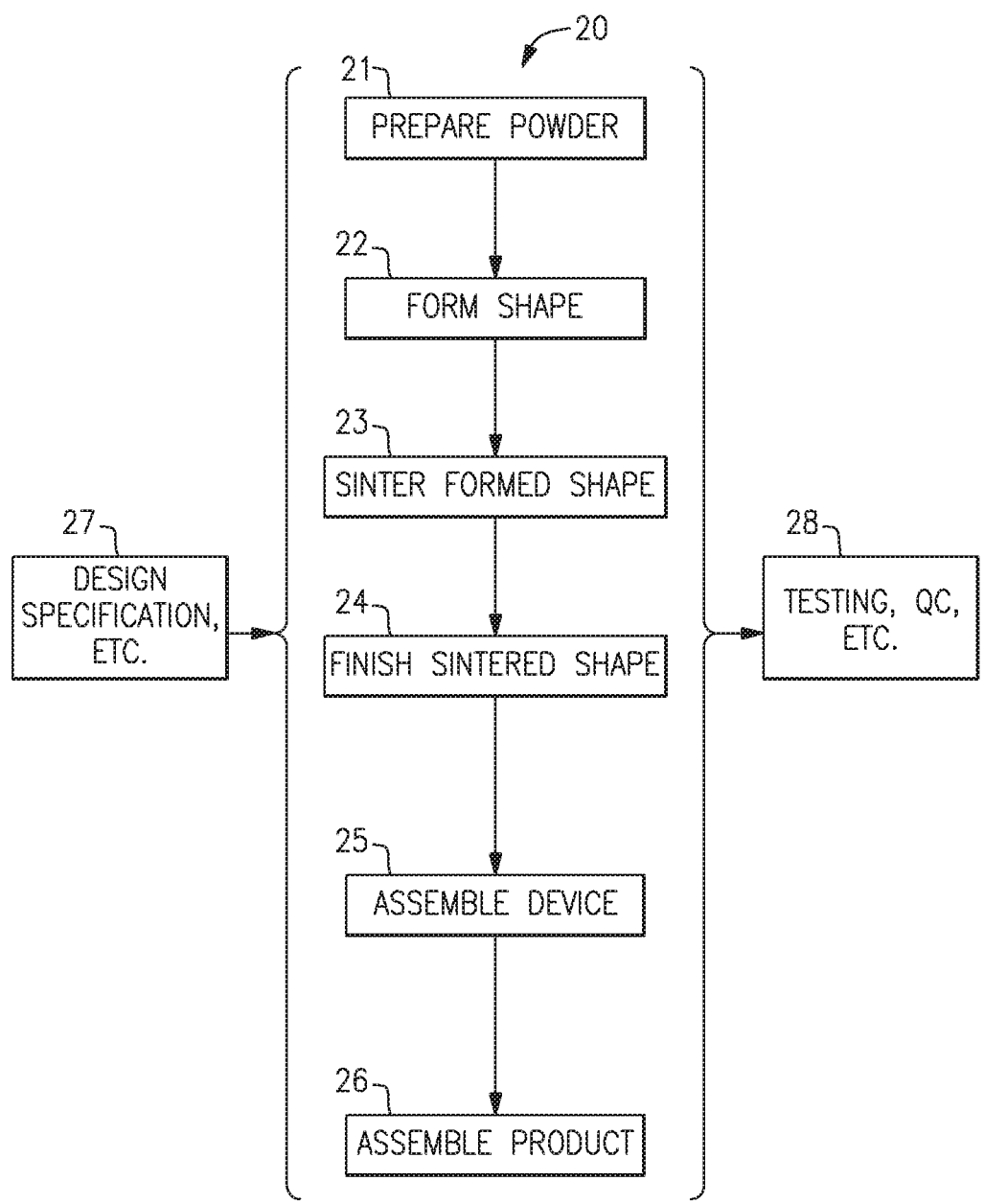
FIG. 29 shows a process that can be implemented to fabricate a ceramic material having one or more features as described herein.

FIG. 29 further shows that some or all of the steps of the example process 20 can be based on a design, specification, etc. Similarly, some or all of the steps can include or be subjected to testing, quality control, etc.

In some implementations, the powder preparation step (block 21) of FIG. 29 can be performed by the example process described in reference to FIG. 8. Powder prepared in such a manner can include one or more properties as described herein, and/or facilitate formation of ceramic objects having one or more properties as described herein.

Figure 30:
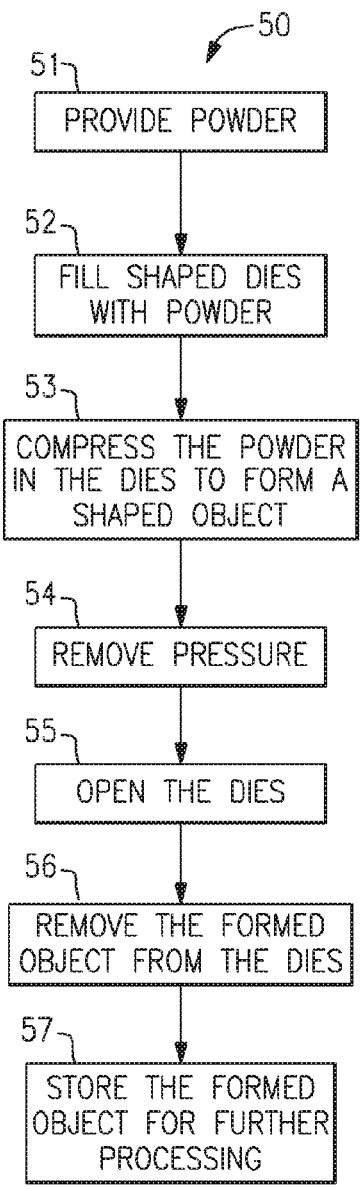
FIG. 30 shows a process that can be implemented to form a shaped object from powder material described herein.
Figure 31:
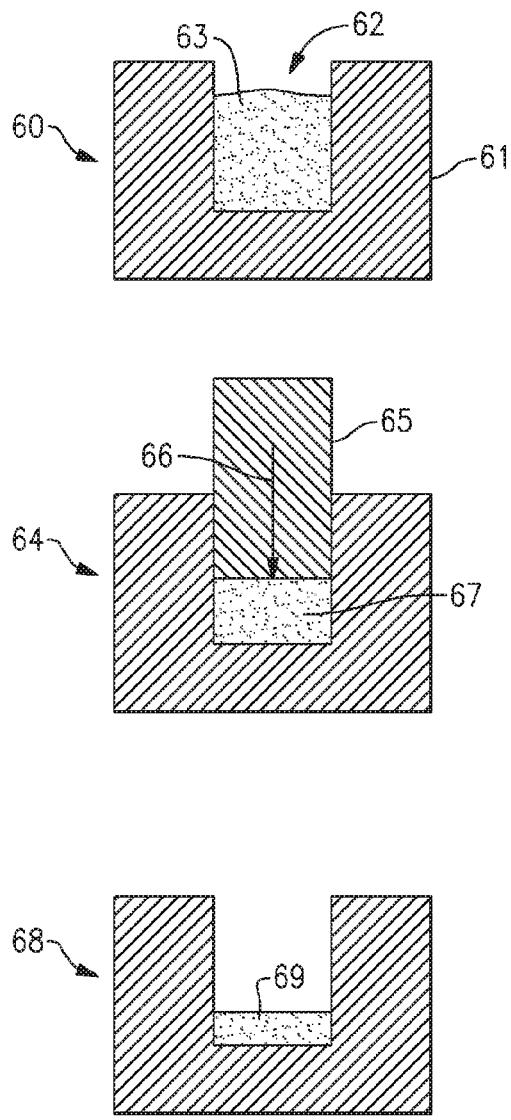
FIG. 31 shows examples of various stages of the process of FIG. 30.

In some implementations, powder prepared as described herein can be formed into different shapes by different forming techniques. By way of examples, FIG. 30 shows a process 50 that can be implemented to press-form a shaped object from a powder material prepared as described herein. In block 52, a shaped die can be filled with a desired amount of the powder. In FIG. 31, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die. In block 56, the formed object (69) can be removed from the die (61). In block 57, the formed object can be stored for further processing.

In some implementations, formed objects fabricated as described herein can be sintered to yield desirable physical properties as ceramic devices. FIG. 32 shows a process 70 that can be implemented to sinter such formed objects. In block 71, formed objects can be provided. In block 72, the formed objects can be introduced into a kiln. In FIG. 33, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 33 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects. Such application of heat can be achieved by use of a kiln. In block 74, the sintered objects can be removed from the kiln. In FIG. 33, the stack 84 having a plurality of loaded trays is depicted as being introduced into a kiln 87 (stage 86a). Such a stack can be moved through the kiln (stages 86b, 86c) based on a desired time and temperature profile. In stage 86d, the stack 84 is depicted as being removed from the kiln so as to be cooled.

In block 75, the sintered objects can be cooled. Such cooling can be based on a desired time and temperature profile. In block 206, the cooled objects can undergo one or more finishing operations. In block 207, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

From the foregoing description, it will be appreciated that inventive products and approaches for isolator/circulator junctions are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A junction configured for use as a circulator or isolator, the junction comprising:

an outer composite dielectric ring, the outer composite dielectric ring being composed of a plurality of first dielectric constant material portions and a plurality of second dielectric constant material portions, the plurality of first dielectric constant material portions having a dielectric constant greater than the plurality of second dielectric constant material portions; and an inner high dielectric constant disc located within an aperture of the outer composite dielectric ring.

2. The junction of claim 1 wherein the inner high dielectric constant disc is a ferrite disc.

3. The junction of claim 1 further including a plurality of transmission lines, the low dielectric constant material portions at least partially covering each of the plurality of transmission lines.

4. The junction of claim 1 wherein the plurality of first dielectric constant material portions are symmetrically spaced around the inner high dielectric constant disc and the plurality of second dielectric constant material portions are symmetrically spaced around the inner high dielectric constant disc.

5. The junction of claim 1 wherein the plurality of first dielectric constant material portions include magnesium titanate, calcium titanate, or combinations thereof.

6. The junction of claim 1 wherein the plurality of second dielectric constant material portions include magnesium titanate, calcium titanate, or combinations thereof.

7. The junction of claim 1 wherein the plurality of first dielectric constant material portions are bonded to the plurality of second dielectric constant material portions.

8. The junction of claim 1 wherein the plurality of second dielectric constant material portions are enclosed by the plurality of first dielectric constant material portions.

9. The junction of claim 1 wherein the plurality of second dielectric constant material portions are a material that at least partially coats the plurality of first dielectric constant material portions.

10. The junction of claim 1 wherein the plurality of first dielectric constant portions has a dielectric constant of at least 30.

11. The junction of claim 1 wherein the plurality of second dielectric constant portions has a dielectric constant of less than 30.

12. The junction of claim 1 wherein the plurality of second dielectric constant portions includes three second dielectric constant portions spaced approximately 120 degrees apart.

13. A radiofrequency device comprising:
a circulator/isolator junction having an outer composite dielectric ring, the outer composite dielectric ring being composed of a plurality of first dielectric constant material portions and a plurality of second dielectric constant material portions, the plurality of first dielectric constant material portions having a dielectric constant greater than the plurality of second dielectric constant material portions, and an inner high dielectric constant disc located within the outer composite dielectric ring.

14. The radiofrequency device of claim 13 wherein the radiofrequency device is a transceiver or an amplifier.

15. The radiofrequency device of claim 13 wherein the radiofrequency device is configured for use in bandwidths of 1.8-2.7 GHz.

16. The radiofrequency device of claim 13 wherein the plurality of first dielectric constant portions has a dielectric constant of at least 30 and the plurality of second dielectric constant portions has a dielectric constant of less than 30.

17. A method of forming an isolator/circulator junction having varied dielectric components, the method comprising:
combining an outer composite dielectric ring with an inner high dielectric constant disc, the inner high dielectric constant disc fitting within the outer composite dielectric ring, the outer composite dielectric ring being formed of a plurality of first dielectric constant material portions and a plurality of second dielectric constant material portions, and the plurality of first dielectric constant material portions having a dielectric constant greater than the plurality of second dielectric constant material portions.

18. The method of claim 17 wherein the combining includes adhering using an adhesive.

19. The method of claim 17 wherein the combining includes frictional connecting.

20. The method of claim 17 wherein the plurality of first dielectric constant portions has a dielectric constant of at least 30 and the plurality of second dielectric constant portions has a dielectric constant of less than 30.

* * * * *